(12) United States Patent
Liodden et al.

(10) Patent No.: US 11,314,838 B2
(45) Date of Patent: *Apr. 26, 2022

(54) SYSTEM AND METHOD FOR ANALYZING USER DEVICE INFORMATION

(71) Applicant: TAPAD, INC., New York, NY (US)

(72) Inventors: Dag Oeyvind Liodden, New York, NY (US); Vivian Wei-Hua Chang, New York, NY (US)

(73) Assignee: Tapad, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/740,957

(22) Filed: Jan. 13, 2020

(65) Prior Publication Data

US 2020/0226186 A1    Jul. 16, 2020

Related U.S. Application Data

(63) Continuation of application No. 14/842,530, filed on Sep. 1, 2015, now Pat. No. 10,754,913, which is a
(Continued)

(51) Int. Cl.
*G06F 16/958* (2019.01)
*G06F 16/28* (2019.01)
(Continued)

(52) U.S. Cl.
CPC .......... *G06F 16/958* (2019.01); *G06F 16/285* (2019.01); *G06F 16/9024* (2019.01);
(Continued)

(58) Field of Classification Search
CPC .... G06F 16/958; G06F 16/285; G06F 16/955; G06F 16/9024; G06Q 30/02;
(Continued)

(56) References Cited

U.S. PATENT DOCUMENTS

| | | |
|---|---|---|
| 4,801,924 A | 1/1989 | Burgmann et al. |
| 4,805,222 A | 2/1989 | Young et al. |
| | (Continued) | |

FOREIGN PATENT DOCUMENTS

| | | |
|---|---|---|
| EP | 0 418 144 | 3/1991 |
| EP | 0 645 692 | 3/1995 |
| | (Continued) | |

OTHER PUBLICATIONS

US 10,534,834 B2, 01/2020, Liodden et al. (withdrawn)
(Continued)

*Primary Examiner* — Gautam Ubale
(74) *Attorney, Agent, or Firm* — Knobbe, Martens, Olson & Bear, LLP

(57) ABSTRACT

A system and method is provided to track users across applications and devices, and to distinguish similar or different users among a number of commonly-used devices. Accordingly, systems and methods are provided for analyzing user device information to determine different users among a number of devices. In particular, user's behavior when using the devices is observed, and responsive to that observed behavior, is the determined whether a particular users are distinguishable from other users. For instance, it may be useful to distinguish between users that operate the same devices or exist within a similar network (e.g., a home network, a workplace network, etc.) for various purposes. For instance, it may be useful to distinguish between users for displaying advertising to these users, performing some other operation with respect to a subset of the users.

16 Claims, 22 Drawing Sheets

Related U.S. Application Data continuation-in-part of application No. 13/677,110, filed on Nov. 14, 2012, now Pat. No. 10,290,017.

(60) Provisional application No. 61/563,963, filed on Nov. 28, 2011, provisional application No. 61/563,277, filed on Nov. 23, 2011, provisional application No. 61/559,879, filed on Nov. 15, 2011.

(51) Int. Cl.

| | | |
|---|---|---|
| *G06F 16/955* | (2019.01) | |
| *G06F 16/901* | (2019.01) | |
| *H04L 67/02* | (2022.01) | |
| *G06Q 30/02* | (2012.01) | |
| *H04L 67/50* | (2022.01) | |
| *H04L 67/14* | (2022.01) | |

(52) U.S. Cl.
CPC ......... *G06F 16/955* (2019.01); *G06Q 30/02* (2013.01); *G06Q 30/0201* (2013.01); *G06Q 30/0241* (2013.01); *H04L 67/02* (2013.01); *H04L 67/14* (2013.01); *H04L 67/22* (2013.01)

(58) Field of Classification Search
CPC ........... G06Q 30/0201; G06Q 30/0241; H04L 67/02; H04L 67/14; H04L 67/22
USPC ...................................... 705/14.49
See application file for complete search history.

(56) References Cited

U.S. PATENT DOCUMENTS

| | | |
|---|---|---|
| 4,912,761 A | 3/1990 | Tan et al. |
| 4,924,387 A | 5/1990 | Jeppesen |
| 5,184,849 A | 2/1993 | Taylor |
| 5,491,735 A | 2/1996 | Hsieh |
| 5,519,827 A | 5/1996 | Mizushima |
| 5,521,907 A | 5/1996 | Ennis, Jr. |
| 5,557,686 A | 9/1996 | Brown et al. |
| 5,583,380 A | 12/1996 | Larsen et al. |
| 5,627,886 A | 5/1997 | Bowman |
| 5,679,940 A | 10/1997 | Templeton et al. |
| 5,721,765 A | 2/1998 | Smith |
| 5,724,424 A | 3/1998 | Giffor |
| 5,748,740 A | 5/1998 | Curry et al. |
| 5,748,780 A | 5/1998 | Stolfo et al. |
| 5,764,275 A | 6/1998 | Lappington et al. |
| 5,802,156 A | 9/1998 | Felger |
| 5,819,226 A | 10/1998 | Gopinathan et al. |
| 5,864,620 A | 1/1999 | Pettitt |
| 5,884,289 A | 3/1999 | Anderson et al. |
| 5,886,334 A | 3/1999 | D'Entremont |
| 5,892,900 A | 4/1999 | Ginter et al. |
| 5,894,510 A | 4/1999 | Felger |
| 5,899,980 A | 5/1999 | Wilf et al. |
| 5,903,646 A | 5/1999 | Rackman |
| 5,903,721 A | 5/1999 | Sixtus |
| 5,933,480 A | 8/1999 | Felger |
| 5,960,069 A | 9/1999 | Felger |
| 6,009,523 A | 12/1999 | Owaki et al. |
| 6,029,154 A | 2/2000 | Pettitt |
| 6,029,159 A | 2/2000 | Zorba et al. |
| 6,062,474 A | 5/2000 | Kroll |
| 6,078,907 A | 6/2000 | Lamm |
| 6,092,053 A | 7/2000 | Boesch et al. |
| 6,094,643 A | 7/2000 | Anderson et al. |
| 6,105,012 A | 8/2000 | Chang et al. |
| 6,112,240 A | 8/2000 | Pogue et al. |
| 6,148,407 A | 11/2000 | Aucsmith |
| 6,151,593 A | 11/2000 | Cho et al. |
| 6,163,604 A | 12/2000 | Baulier et al. |
| 6,163,771 A | 12/2000 | Walker et al. |
| 6,164,528 A | 12/2000 | Hills et al. |
| 6,205,436 B1 | 3/2001 | Rosen et al. |
| 6,209,104 B1 | 3/2001 | Jalili |
| 6,216,153 B1 | 4/2001 | Vortriede |
| 6,223,289 B1 | 4/2001 | Wall et al. |
| 6,282,276 B1 | 8/2001 | Felger |
| 6,295,605 B1 | 9/2001 | Dockter et al. |
| 6,327,384 B1 | 12/2001 | Hirao et al. |
| 6,330,546 B1 | 12/2001 | Gopinathan et al. |
| 6,370,648 B1 | 4/2002 | Diep |
| 6,405,922 B1 | 6/2002 | Kroll |
| 6,442,529 B1 | 8/2002 | Krishan et al. |
| 6,442,692 B1 | 8/2002 | Zilberman |
| 6,457,021 B1 | 9/2002 | Berkowitz et al. |
| 6,480,710 B1 | 11/2002 | Laybourn et al. |
| 6,509,847 B1 | 1/2003 | Anderson |
| 6,523,019 B1 | 2/2003 | Borthwick |
| 6,546,493 B1 | 4/2003 | Magdych et al. |
| 6,553,108 B1 | 4/2003 | Felger |
| 6,560,455 B2 | 5/2003 | Amin et al. |
| 6,567,099 B1 | 5/2003 | Dawson |
| 6,597,775 B2 | 7/2003 | Lawyer et al. |
| 6,646,765 B1 | 11/2003 | Barker et al. |
| 6,678,666 B1 | 1/2004 | Boulware |
| 6,687,390 B2 | 2/2004 | Avni et al. |
| 6,687,696 B2 | 2/2004 | Hofmann et al. |
| 6,689,055 B1 | 2/2004 | Mullen et al. |
| 6,718,363 B1 | 4/2004 | Ponte |
| 6,745,333 B1 | 6/2004 | Thomsen |
| 6,803,920 B2 | 10/2004 | Gossett et al. |
| 6,804,624 B2 | 10/2004 | Silverman |
| 6,850,606 B2 | 2/2005 | Lawyer et al. |
| 6,892,307 B1 | 5/2005 | Wood et al. |
| 6,895,507 B1 | 5/2005 | Tepler |
| 6,895,514 B1 | 5/2005 | Kermani |
| 6,898,709 B1 | 5/2005 | Teppler |
| 6,908,030 B2 | 6/2005 | Rajasekaran et al. |
| 6,937,569 B1 | 8/2005 | Sarkar et al. |
| 6,947,978 B2 | 9/2005 | Huffman |
| 6,954,532 B1 | 10/2005 | Handley et al. |
| 6,957,185 B1 | 10/2005 | Labaton |
| 6,957,339 B2 | 10/2005 | Shinzaki |
| 7,002,712 B2 | 2/2006 | Barker et al. |
| 7,003,670 B2 | 2/2006 | Heaven et al. |
| 7,007,174 B2 | 2/2006 | Wheeler et al. |
| 7,013,001 B1 | 3/2006 | Felger |
| 7,027,800 B2 | 4/2006 | Haumont et al. |
| 7,039,505 B1 | 5/2006 | Southard et al. |
| 7,039,699 B1 | 5/2006 | Narin et al. |
| 7,043,640 B2 | 5/2006 | Pritchard et al. |
| 7,089,310 B1 | 8/2006 | Ellerman et al. |
| 7,089,585 B1 | 8/2006 | Dharmarajan |
| 7,096,192 B1 | 8/2006 | Pettitt |
| 7,100,049 B2 | 8/2006 | Gasparini et al. |
| 7,103,570 B1 | 9/2006 | Morea et al. |
| 7,103,668 B1 | 9/2006 | Corley et al. |
| 7,120,590 B1 | 10/2006 | Eisen et al. |
| 7,130,858 B2 | 10/2006 | Ciaramitaro et al. |
| 7,143,095 B2 | 11/2006 | Barrett et al. |
| 7,158,622 B2 | 1/2007 | Lawyer et al. |
| 7,165,051 B2 | 1/2007 | Ronning et al. |
| 7,174,454 B2 | 2/2007 | Roskind |
| 7,191,467 B1 | 3/2007 | Dujari et al. |
| 7,197,646 B2 | 3/2007 | Fritz et al. |
| 7,221,949 B2 | 5/2007 | Clough |
| 7,225,974 B2 | 6/2007 | Yamauchi |
| 7,237,717 B1 | 7/2007 | Rao et al. |
| 7,249,093 B1 | 7/2007 | King |
| 7,251,624 B1 | 7/2007 | Lee et al. |
| 7,260,837 B2 | 8/2007 | Abraham et al. |
| 7,263,492 B1 | 8/2007 | Suresh et al. |
| 7,263,506 B2 | 8/2007 | Lee et al. |
| 7,272,610 B2 | 9/2007 | Torres |
| 7,272,728 B2 | 9/2007 | Pierson et al. |
| 7,292,723 B2 | 11/2007 | Tedesco et al. |
| 7,293,096 B1 | 11/2007 | Foltak et al. |
| 7,296,088 B1 | 11/2007 | Padmanabhan et al. |
| 7,328,216 B2 | 2/2008 | Hofmann et al. |
| 7,330,824 B1 | 2/2008 | Kanojia et al. |
| 7,330,871 B2 | 2/2008 | Barber |
| 7,340,045 B2 | 3/2008 | Felger |

(56) References Cited

U.S. PATENT DOCUMENTS

| | | | |
|---|---|---|---|
| 7,346,551 B2 | 3/2008 | Pe Jimenez et al. |
| 7,346,775 B2 | 3/2008 | Gasparinl et al. |
| 7,349,955 B1 | 3/2008 | Korb et al. |
| 7,359,962 B2 | 4/2008 | Willebeek-LeMair et al. |
| 7,363,170 B2 | 4/2008 | Seul et al. |
| 7,373,669 B2 | 5/2008 | Eisen |
| 7,376,618 B1 | 5/2008 | Anderson et al. |
| 7,379,891 B1 | 5/2008 | Donner et al. |
| 7,404,087 B2 | 6/2008 | Teunen |
| 7,401,082 B2 | 7/2008 | Keene et al. |
| 7,403,922 B1 | 7/2008 | Lewis et al. |
| 7,406,441 B2 | 7/2008 | Kimura et al. |
| 7,428,587 B2 | 9/2008 | Rowland et al. |
| 7,436,780 B2 | 10/2008 | Stephens |
| 7,438,226 B2 | 10/2008 | Helsper et al. |
| 7,447,494 B2 | 11/2008 | Law et al. |
| 7,451,487 B2 | 11/2008 | Oliver et al. |
| 7,457,401 B2 | 11/2008 | Lawyer et al. |
| 7,457,823 B2 | 11/2008 | Shraim et al. |
| 7,475,242 B2 | 1/2009 | Baird et al. |
| 7,478,182 B2 | 1/2009 | Schweig |
| 7,487,350 B2 | 2/2009 | Utin |
| 7,496,752 B2 | 2/2009 | Yamaguchi et al. |
| 7,497,374 B2 | 3/2009 | Helsper et al. |
| 7,502,610 B2 | 3/2009 | Maher |
| 7,502,933 B2 | 3/2009 | Jakobsson et al. |
| 7,526,796 B2 | 4/2009 | Lulich et al. |
| 7,543,740 B2 | 6/2009 | Greene et al. |
| 7,552,090 B1 | 6/2009 | Barber |
| 7,555,458 B1 | 6/2009 | Felger |
| 7,562,221 B2 | 7/2009 | Nyström et al. |
| 7,577,620 B1 | 8/2009 | Donner |
| 7,581,112 B2 | 8/2009 | Brown et al. |
| 7,606,560 B2 | 10/2009 | Labrou et al. |
| 7,630,924 B1 | 12/2009 | Collins et al. |
| 7,631,808 B2 | 12/2009 | Kundu et al. |
| 7,657,626 B1 | 2/2010 | Zwicky |
| 7,660,902 B2 | 2/2010 | Graham et al. |
| 7,665,140 B2 | 2/2010 | Oliver et al. |
| 7,665,658 B2 | 2/2010 | Fields |
| 7,673,793 B2 | 3/2010 | Greene et al. |
| 7,685,629 B1 | 3/2010 | White et al. |
| 7,698,743 B2 | 4/2010 | Ohmori et al. |
| 7,708,200 B2 | 5/2010 | Helsper et al. |
| 7,711,846 B2 | 5/2010 | Padmanabhan et al. |
| 7,735,141 B1 | 6/2010 | Noel et al. |
| 7,739,402 B2 | 6/2010 | Roese et al. |
| 7,739,512 B2 | 6/2010 | Hawkes |
| 7,743,409 B2 | 6/2010 | Gonzalez et al. |
| 7,752,084 B2 | 7/2010 | Pettitt |
| 7,756,783 B2 | 7/2010 | Crooks |
| 7,761,379 B2 | 7/2010 | Zoldi et al. |
| 7,769,032 B1 * | 8/2010 | Ou | H04L 45/123 370/401 |
| 7,778,846 B2 | 8/2010 | Suresh et al. |
| 7,813,937 B1 | 10/2010 | Pathria et al. |
| 7,813,944 B1 | 10/2010 | Luk et al. |
| 7,814,029 B1 * | 10/2010 | Siegel | G06Q 30/0282 705/347 |
| 7,849,029 B2 | 12/2010 | Crooks et al. |
| 7,849,307 B2 | 12/2010 | Roskind |
| 7,853,526 B2 | 12/2010 | Milana |
| 7,853,533 B2 | 12/2010 | Eisen |
| 7,856,372 B2 | 12/2010 | Ullah |
| 7,860,783 B2 | 12/2010 | Yang et al. |
| 7,861,260 B2 | 12/2010 | Shkedi |
| 7,865,427 B2 | 1/2011 | Wright et al. |
| 7,882,217 B2 | 2/2011 | Katzir |
| 7,908,223 B2 | 3/2011 | Klein et al. |
| 7,908,645 B2 | 3/2011 | Varghese et al. |
| 7,930,285 B2 | 4/2011 | Abraham et al. |
| 7,933,984 B1 | 4/2011 | Smith et al. |
| 7,937,467 B2 | 5/2011 | Barber |
| 7,940,929 B1 | 5/2011 | Sengupta |
| 7,945,494 B2 | 5/2011 | Williams |
| 7,945,515 B2 | 5/2011 | Zoldi et al. |
| 7,949,564 B1 | 5/2011 | Hughes et al. |
| 7,958,029 B1 | 6/2011 | Bobich et al. |
| 7,958,246 B2 | 6/2011 | Barber |
| 7,961,857 B2 | 6/2011 | Zoldi et al. |
| 7,970,701 B2 | 6/2011 | Lewis et al. |
| 7,983,490 B1 * | 7/2011 | Minter | G06K 9/6284 382/224 |
| 7,983,691 B1 | 7/2011 | Wong et al. |
| 7,991,716 B2 | 8/2011 | Crooks et al. |
| 7,995,996 B2 | 8/2011 | Link, II et al. |
| 8,001,376 B2 | 8/2011 | Utin |
| 8,001,597 B2 | 8/2011 | Crooks |
| 8,015,614 B2 | 9/2011 | Matsuzaki et al. |
| 8,015,921 B2 | 9/2011 | Leppanen et al. |
| 8,019,678 B2 | 9/2011 | Wright et al. |
| 8,020,763 B1 | 9/2011 | Kowalchyk et al. |
| 8,024,266 B1 | 9/2011 | Barber |
| 8,025,220 B2 | 9/2011 | Zoldi et al. |
| 8,027,439 B2 | 9/2011 | Zoldi et al. |
| 8,032,448 B2 | 10/2011 | Anderson et al. |
| 8,037,097 B2 | 10/2011 | Guo et al. |
| 8,037,511 B1 | 10/2011 | Lundy et al. |
| 8,041,597 B2 | 10/2011 | Li et al. |
| 8,042,164 B2 | 10/2011 | Sheynblat et al. |
| 8,046,271 B2 | 10/2011 | Jimenez et al. |
| 8,060,922 B2 | 11/2011 | Crichton et al. |
| 8,065,233 B2 | 11/2011 | Lee et al. |
| 8,090,648 B2 | 1/2012 | Zoldi et al. |
| 8,108,378 B2 | 1/2012 | Ott, IV et al. |
| 8,121,962 B2 | 2/2012 | Vaiciulis et al. |
| 8,122,082 B2 | 2/2012 | Klein |
| 8,126,816 B2 | 2/2012 | Mu et al. |
| 8,131,615 B2 | 3/2012 | Diev et al. |
| 8,140,689 B2 | 3/2012 | Barber |
| 8,141,148 B2 | 3/2012 | Thomas et al. |
| 8,145,560 B2 | 3/2012 | Kulkarni et al. |
| 8,145,762 B2 | 3/2012 | Barber |
| 8,150,968 B2 | 4/2012 | Barber |
| 8,151,327 B2 | 4/2012 | Eisen |
| 8,166,068 B2 | 4/2012 | Stevens |
| 8,175,897 B2 | 5/2012 | Lee et al. |
| 8,176,178 B2 | 5/2012 | Thomas et al. |
| 8,180,686 B2 | 5/2012 | Ryu et al. |
| 8,181,015 B2 | 5/2012 | Roskind |
| 8,185,953 B2 | 5/2012 | Rothstein et al. |
| 8,190,513 B2 | 5/2012 | Felger |
| 8,190,529 B2 | 5/2012 | Abe et al. |
| 8,191,148 B2 | 5/2012 | Oliver et al. |
| 8,201,099 B1 | 6/2012 | Osbourn et al. |
| 8,204,833 B2 | 6/2012 | Mu et al. |
| 8,209,744 B2 | 6/2012 | Zhu et al. |
| 8,209,760 B1 | 6/2012 | Hardman |
| 8,213,898 B2 | 7/2012 | Choti et al. |
| 8,214,232 B2 | 7/2012 | Tyler et al. |
| 8,214,285 B2 | 7/2012 | Hu et al. |
| 8,219,415 B2 | 7/2012 | Tyler et al. |
| 8,224,308 B1 * | 7/2012 | Gavrylyako | H04L 67/02 455/418 |
| 8,224,348 B2 | 7/2012 | Bolon et al. |
| 8,229,844 B2 | 7/2012 | Felger |
| 8,250,631 B2 | 8/2012 | Iyengar et al. |
| 8,266,295 B2 | 9/2012 | Klein et al. |
| 8,271,891 B1 | 9/2012 | Osbourn et al. |
| 8,280,833 B2 | 10/2012 | Miltonberger |
| 8,290,838 B1 | 10/2012 | Thakur et al. |
| 8,295,898 B2 | 10/2012 | Ashfield et al. |
| 8,296,228 B1 | 10/2012 | Kloor |
| 8,296,229 B1 | 10/2012 | Yellin et al. |
| 8,296,245 B2 | 10/2012 | Barber et al. |
| 8,296,250 B2 | 10/2012 | Crooks et al. |
| 8,306,933 B2 | 11/2012 | Kawai et al. |
| 8,307,430 B1 | 11/2012 | Chen et al. |
| 8,311,907 B2 | 11/2012 | Klein et al. |
| 8,321,269 B2 | 11/2012 | Linden et al. |
| 8,326,759 B2 | 12/2012 | Hammad |
| 8,326,760 B2 | 12/2012 | Ma et al. |
| 8,326,763 B2 | 12/2012 | Zuili |
| 8,332,338 B2 | 12/2012 | Vaiciulis et al. |

(56) References Cited

U.S. PATENT DOCUMENTS

| | | |
|---|---|---|
| 8,332,522 B2 | 12/2012 | Barber |
| 8,370,253 B1 | 2/2013 | Grossman et al. |
| 8,370,638 B2 | 2/2013 | Duane et al. |
| 8,380,831 B2 | 2/2013 | Barber |
| 8,392,987 B2 | 3/2013 | Sasamura et al. |
| 8,407,112 B2 | 3/2013 | Walter |
| 8,407,798 B1 | 3/2013 | Lotem et al. |
| 8,417,587 B2 | 4/2013 | Jimenez et al. |
| 8,423,458 B2 | 4/2013 | Barber |
| 8,424,061 B2 | 4/2013 | Rosenor |
| 8,429,070 B2 | 4/2013 | Hu et al. |
| 8,438,134 B2 | 5/2013 | Wang et al. |
| 8,438,184 B1 * | 5/2013 | Wang .............. H04L 67/306 707/780 |
| 8,443,202 B2 | 5/2013 | White et al. |
| 8,452,715 B2 | 5/2013 | Barber |
| 8,453,226 B2 | 5/2013 | Hammad |
| 8,462,161 B1 | 6/2013 | Barber |
| 8,464,290 B2 | 6/2013 | Beyda et al. |
| 8,468,582 B2 | 6/2013 | Kuang et al. |
| 8,484,470 B2 | 7/2013 | Sakakihara et al. |
| 8,495,714 B2 | 7/2013 | Jones et al. |
| 8,516,439 B2 | 8/2013 | Brass et al. |
| 8,539,070 B2 | 9/2013 | Barber |
| 8,543,522 B2 | 9/2013 | Ryman-Tubb et al. |
| 8,548,137 B2 | 10/2013 | Zoldi et al. |
| 8,559,607 B2 | 10/2013 | Zoldi et al. |
| 8,567,669 B2 | 10/2013 | Griegel et al. |
| 8,588,816 B2 | 11/2013 | Collins |
| 8,601,109 B2 | 12/2013 | Johannsen |
| 8,611,856 B2 | 12/2013 | Yan et al. |
| 8,612,854 B2 | 12/2013 | Eisen et al. |
| 8,620,942 B1 | 12/2013 | Hoffman et al. |
| 8,631,006 B1 * | 1/2014 | Haveliwala ......... G06F 16/9535 707/732 |
| 8,660,539 B2 | 2/2014 | Khambete et al. |
| 8,661,119 B1 * | 2/2014 | Jindal .............. H04L 67/303 709/224 |
| 8,676,684 B2 | 3/2014 | Newman et al. |
| 8,677,398 B2 | 3/2014 | Shkedi |
| 8,683,561 B2 | 3/2014 | Utin |
| 8,688,543 B2 | 4/2014 | Dominguez |
| 8,701,168 B2 | 4/2014 | Sastry et al. |
| 8,701,170 B1 | 4/2014 | Barber |
| 8,725,570 B2 * | 5/2014 | Doughty ............ G06Q 30/0269 705/14.66 |
| 8,751,815 B2 | 6/2014 | Lunde et al. |
| 8,762,283 B2 | 6/2014 | Gerber et al. |
| 8,762,574 B2 | 6/2014 | Barber |
| 8,763,113 B2 | 6/2014 | Thomas et al. |
| 8,776,225 B2 | 7/2014 | Pierson et al. |
| 8,779,981 B2 | 7/2014 | Eisen et al. |
| 8,781,975 B2 | 7/2014 | Bennett et al. |
| 8,782,783 B2 | 7/2014 | Thomas et al. |
| 8,799,458 B2 | 8/2014 | Barber |
| 8,817,984 B2 | 8/2014 | Miller et al. |
| 8,826,393 B2 | 9/2014 | Eisen |
| 8,838,478 B2 | 9/2014 | Kretz et al. |
| 8,838,967 B1 | 9/2014 | Mills et al. |
| 8,862,514 B2 | 10/2014 | Eisen |
| 8,862,526 B2 | 10/2014 | Miltonberger |
| 8,874,735 B2 | 10/2014 | Barber |
| 8,880,097 B1 * | 11/2014 | Xu .................. H04W 4/02 455/456.1 |
| 8,881,288 B1 | 11/2014 | Levy et al. |
| 8,938,671 B2 | 1/2015 | Eisen et al. |
| 8,954,560 B2 | 2/2015 | Johannsen |
| 8,966,276 B2 | 2/2015 | Nanopoulos et al. |
| 9,038,153 B2 | 5/2015 | Barber |
| 9,060,012 B2 | 6/2015 | Eisen |
| 9,075,896 B2 | 7/2015 | Barber |
| 9,083,735 B2 | 7/2015 | Reumann et al. |
| 9,098,617 B1 | 8/2015 | Pauley, Jr. et al. |
| 9,112,850 B1 | 8/2015 | Eisen |
| 9,118,646 B2 | 8/2015 | Pierson et al. |
| 9,172,691 B2 | 10/2015 | Barber |
| 9,177,293 B1 | 11/2015 | Gagnon et al. |
| 9,183,567 B2 | 11/2015 | Barber |
| 9,191,370 B2 | 11/2015 | Barber et al. |
| 9,196,004 B2 | 11/2015 | Eisen |
| 9,202,039 B2 * | 12/2015 | Dandu ............... G06F 21/44 |
| 9,203,837 B2 | 12/2015 | Pierson et al. |
| 9,294,448 B2 | 3/2016 | Miller et al. |
| 9,298,677 B2 | 3/2016 | Tollinger et al. |
| 9,332,020 B2 | 5/2016 | Thomas et al. |
| 9,361,597 B2 | 6/2016 | Britton et al. |
| 9,378,500 B2 | 6/2016 | Jimenez et al. |
| 9,390,384 B2 | 7/2016 | Eisen |
| 9,396,331 B2 | 7/2016 | Eisen et al. |
| 9,412,123 B2 | 8/2016 | Eisen |
| 9,477,968 B2 | 10/2016 | Barber |
| 9,514,248 B1 | 12/2016 | Guan et al. |
| 9,514,446 B1 * | 12/2016 | Rajkumar ............. H04L 9/0861 |
| 9,521,161 B2 | 12/2016 | Reumann et al. |
| 9,521,551 B2 | 12/2016 | Eisen et al. |
| 9,559,852 B2 | 1/2017 | Miller et al. |
| 9,603,016 B1 | 3/2017 | Mills et al. |
| 9,633,201 B1 | 4/2017 | Katz |
| 9,699,164 B2 | 7/2017 | Barber |
| 9,702,961 B2 | 7/2017 | Shields |
| 9,703,983 B2 | 7/2017 | Eisen et al. |
| 9,712,497 B2 | 7/2017 | Barber et al. |
| 9,722,968 B2 | 8/2017 | Barber |
| 9,754,256 B2 | 9/2017 | Britton et al. |
| 9,754,311 B2 | 9/2017 | Eisen |
| 9,781,151 B1 | 10/2017 | McCorkendale et al. |
| 9,785,973 B2 | 10/2017 | Tollinger et al. |
| 9,916,393 B2 | 3/2018 | Barber |
| 9,948,629 B2 | 4/2018 | Eisen |
| 9,990,631 B2 | 6/2018 | Eisen |
| 10,021,099 B2 | 7/2018 | Eisen et al. |
| 10,037,529 B2 | 7/2018 | Barber |
| 10,089,679 B2 | 10/2018 | Eisen |
| 10,091,312 B1 | 10/2018 | Khanwalkar et al. |
| 10,290,017 B2 | 5/2019 | Traasdahl et al. |
| 10,305,880 B2 | 5/2019 | Barber |
| 10,339,306 B1 | 7/2019 | Katz |
| 10,341,344 B2 | 7/2019 | Eisen et al. |
| 10,395,252 B2 | 8/2019 | Eisen |
| 10,402,854 B2 | 9/2019 | Barber |
| 10,417,637 B2 | 9/2019 | Eisen |
| 10,425,379 B2 | 9/2019 | Barber |
| 10,453,066 B2 | 10/2019 | Eisen |
| 10,535,093 B2 | 1/2020 | Eisen |
| 10,616,201 B2 | 4/2020 | Eisen |
| 10,642,899 B2 | 5/2020 | Barber |
| 10,679,216 B2 | 6/2020 | Barber |
| 10,691,751 B2 | 6/2020 | Atlas et al. |
| 10,726,151 B2 | 7/2020 | Eisen et al. |
| 10,728,350 B1 | 7/2020 | Khanwalkar et al. |
| 10,754,913 B2 | 8/2020 | Liodden et al. |
| 10,853,813 B2 | 12/2020 | Eisen |
| 10,862,889 B2 | 12/2020 | Eisen et al. |
| 10,902,327 B1 | 1/2021 | Yalov et al. |
| 10,999,298 B2 | 5/2021 | Eisen |
| 11,010,468 B1 | 5/2021 | Katz |
| 11,095,643 B2 | 8/2021 | Huffman et al. |
| 2001/0011243 A1 | 8/2001 | Dembo et al. |
| 2001/0011304 A1 | 8/2001 | Wesigner et al. |
| 2001/0016840 A1 | 8/2001 | Hijikata et al. |
| 2001/0016876 A1 | 8/2001 | Kurth et al. |
| 2001/0018739 A1 | 8/2001 | Anderson et al. |
| 2001/0034712 A1 | 10/2001 | Colvin |
| 2001/0046096 A1 | 11/2001 | Worden |
| 2002/0035622 A1 | 3/2002 | Barber |
| 2002/0041328 A1 | 4/2002 | LeCompte et al. |
| 2002/0046157 A1 | 4/2002 | Solomon |
| 2002/0052852 A1 | 5/2002 | Bozeman |
| 2002/0056042 A1 | 5/2002 | van der Kaay et al. |
| 2002/0073046 A1 | 6/2002 | David |
| 2002/0073327 A1 | 6/2002 | Vellandi |
| 2002/0083079 A1 | 6/2002 | Meier et al. |
| 2002/0112171 A1 | 8/2002 | Ginter et al. |

(56) References Cited

U.S. PATENT DOCUMENTS

| | | |
|---|---|---|
| 2002/0128917 A1 | 9/2002 | Grounds |
| 2002/0138335 A1 | 9/2002 | Palmer et al. |
| 2002/0138577 A1 | 9/2002 | Teng et al. |
| 2002/0153424 A1 | 10/2002 | Li |
| 2002/0156724 A1 | 10/2002 | Levchin et al. |
| 2002/0156836 A1 | 10/2002 | Janosik, Jr. et al. |
| 2002/0166063 A1 | 11/2002 | Lachman et al. |
| 2002/0167965 A1 | 11/2002 | Beasley et al. |
| 2003/0002732 A1 | 1/2003 | Gossett et al. |
| 2003/0002740 A1 | 1/2003 | Melikian et al. |
| 2003/0014327 A1 | 1/2003 | Skantze |
| 2003/0033161 A1 | 2/2003 | Walker et al. |
| 2003/0033356 A1 | 2/2003 | Tran et al. |
| 2003/0070080 A1 | 4/2003 | Rosen |
| 2003/0074301 A1 | 4/2003 | Solomon |
| 2003/0076242 A1 | 4/2003 | Burns et al. |
| 2003/0105707 A1 | 6/2003 | Audebert et al. |
| 2003/0105854 A1 | 6/2003 | Thorsteinsson et al. |
| 2003/0113033 A1 | 6/2003 | Huang |
| 2003/0115334 A1 | 6/2003 | Bhat et al. |
| 2003/0115481 A1 | 6/2003 | Baird et al. |
| 2003/0120543 A1 | 6/2003 | Carey |
| 2003/0120586 A1 | 6/2003 | Litty |
| 2003/0140258 A1 | 7/2003 | Nelson et al. |
| 2003/0140283 A1 | 7/2003 | Nishio |
| 2003/0154214 A1 | 8/2003 | Tu et al. |
| 2003/0158751 A1 | 8/2003 | Suresh et al. |
| 2003/0163359 A1 | 8/2003 | Kanesaka |
| 2003/0163398 A1 | 8/2003 | Yoshioka et al. |
| 2003/0163413 A1 | 8/2003 | Wiczkowski |
| 2003/0172036 A1 | 9/2003 | Feigenbaum |
| 2003/0182551 A1 | 9/2003 | Frantz et al. |
| 2003/0208684 A1 | 11/2003 | Camacho et al. |
| 2003/0212618 A1 | 11/2003 | Keyes et al. |
| 2003/0233553 A1 | 12/2003 | Parks et al. |
| 2003/0237000 A1 | 12/2003 | Denton et al. |
| 2004/0001044 A1 | 1/2004 | Luciani et al. |
| 2004/0004733 A1 | 1/2004 | Barker et al. |
| 2004/0006553 A1 | 1/2004 | de Vries et al. |
| 2004/0010682 A1 | 1/2004 | Foster et al. |
| 2004/0027385 A1 | 2/2004 | Rekimoto et al. |
| 2004/0030912 A1 | 2/2004 | Merkle, Jr. et al. |
| 2004/0034794 A1 | 2/2004 | Mayer et al. |
| 2004/0066023 A1 | 4/2004 | Joseph |
| 2004/0073809 A1 | 4/2004 | Wing Keong |
| 2004/0088313 A1 | 5/2004 | Torres |
| 2004/0098618 A1 | 5/2004 | Kim et al. |
| 2004/0105431 A1 | 6/2004 | Monjas-Llorente et al. |
| 2004/0111621 A1 | 6/2004 | Himberger et al. |
| 2004/0111632 A1 | 6/2004 | Halperin |
| 2004/0117321 A1 | 6/2004 | Sancho |
| 2004/0139008 A1 | 7/2004 | Mascavaage, III |
| 2004/0153644 A1 | 8/2004 | McCorkendale et al. |
| 2004/0159699 A1 | 8/2004 | Nelson et al. |
| 2004/0166857 A1 | 8/2004 | Shim et al. |
| 2004/0171381 A1 | 9/2004 | Inselberg |
| 2004/0181598 A1 | 9/2004 | Paya et al. |
| 2004/0187023 A1 | 9/2004 | Alagna et al. |
| 2004/0203750 A1 | 10/2004 | Cowdrey et al. |
| 2004/0230820 A1 | 11/2004 | Hui Hsu et al. |
| 2004/0236696 A1 | 11/2004 | Aoki et al. |
| 2004/0236702 A1 | 11/2004 | Fink et al. |
| 2004/0254890 A1 | 12/2004 | Sancho et al. |
| 2004/0260876 A1 | 12/2004 | Singh et al. |
| 2004/0260922 A1 | 12/2004 | Goodman et al. |
| 2005/0008148 A1 | 1/2005 | Jacobson |
| 2005/0015601 A1 | 1/2005 | Tabi |
| 2005/0022020 A1 | 1/2005 | Fremberg et al. |
| 2005/0033653 A1 | 2/2005 | Eisenberg et al. |
| 2005/0033703 A1 | 2/2005 | Holdsworth |
| 2005/0039034 A1 | 2/2005 | Doyle et al. |
| 2005/0039219 A1 | 2/2005 | Cooper et al. |
| 2005/0074015 A1 | 4/2005 | Chari et al. |
| 2005/0076230 A1 | 4/2005 | Redenbaugh et al. |
| 2005/0085931 A1 | 4/2005 | Willeby |
| 2005/0097320 A1 | 5/2005 | Golan et al. |
| 2005/0108177 A1 | 5/2005 | Sancho |
| 2005/0111054 A1 | 5/2005 | Umeda |
| 2005/0113092 A1 | 5/2005 | Coppinger et al. |
| 2005/0131826 A1 | 6/2005 | Cook |
| 2005/0165643 A1 | 7/2005 | Wilson et al. |
| 2005/0185225 A1 | 8/2005 | Brawn et al. |
| 2005/0188423 A1 | 8/2005 | Motsinger et al. |
| 2005/0204159 A1 | 9/2005 | Davis et al. |
| 2005/0210533 A1 | 9/2005 | Copeland et al. |
| 2005/0246551 A1 | 11/2005 | Dondl et al. |
| 2005/0278542 A1 | 12/2005 | Pierson et al. |
| 2006/0008779 A1 | 1/2006 | Shand et al. |
| 2006/0010072 A1 | 1/2006 | Eisen |
| 2006/0026669 A1 | 2/2006 | Zakas |
| 2006/0031938 A1 | 2/2006 | Choi |
| 2006/0048211 A1 | 3/2006 | Pierson et al. |
| 2006/0064346 A1 | 3/2006 | Steenstra et al. |
| 2006/0069619 A1 | 3/2006 | Walker et al. |
| 2006/0075492 A1 | 4/2006 | Golan et al. |
| 2006/0080263 A1 | 4/2006 | Willis et al. |
| 2006/0126829 A1 | 6/2006 | Lai |
| 2006/0130132 A1 | 6/2006 | Dharmarajan |
| 2006/0136294 A1 | 6/2006 | Linden et al. |
| 2006/0155985 A1 | 7/2006 | Canard et al. |
| 2006/0161501 A1 | 7/2006 | Waserstein et al. |
| 2006/0176984 A1 | 8/2006 | Lee et al. |
| 2006/0190331 A1 | 8/2006 | Tollinger et al. |
| 2006/0190489 A1 | 8/2006 | Vohariwatt et al. |
| 2006/0200855 A1 | 9/2006 | Willis |
| 2006/0200856 A1 | 9/2006 | Salowey et al. |
| 2006/0224898 A1 | 10/2006 | Ahmed |
| 2006/0237531 A1 | 10/2006 | Heffez et al. |
| 2006/0253327 A1 | 11/2006 | Morris et al. |
| 2006/0253328 A1 | 11/2006 | Kohli et al. |
| 2006/0264202 A1 | 11/2006 | Hagmeier et al. |
| 2006/0281541 A1 | 12/2006 | Nguyen et al. |
| 2006/0282660 A1 | 12/2006 | Varghese et al. |
| 2006/0284838 A1 | 12/2006 | Tsatalos et al. |
| 2007/0011078 A1 | 1/2007 | Jain et al. |
| 2007/0026942 A1 | 2/2007 | Kinsley et al. |
| 2007/0030528 A1 | 2/2007 | Quaeler et al. |
| 2007/0038568 A1 | 2/2007 | Greene et al. |
| 2007/0043837 A1 | 2/2007 | Kruse et al. |
| 2007/0061211 A1 | 3/2007 | Ramer et al. |
| 2007/0061273 A1 | 3/2007 | Greene et al. |
| 2007/0073630 A1 | 3/2007 | Greene et al. |
| 2007/0094594 A1 | 4/2007 | Matichuk et al. |
| 2007/0097076 A1 | 5/2007 | Gross |
| 2007/0097976 A1 | 5/2007 | Wood et al. |
| 2007/0101405 A1 | 5/2007 | Engle et al. |
| 2007/0107059 A1 | 5/2007 | Chasin et al. |
| 2007/0118892 A1 | 5/2007 | Sastry et al. |
| 2007/0124246 A1 | 5/2007 | Lawyer et al. |
| 2007/0162763 A1 | 7/2007 | Bender et al. |
| 2007/0198410 A1 | 8/2007 | Labgold et al. |
| 2007/0199054 A1 | 8/2007 | Florencio et al. |
| 2007/0204044 A1 | 8/2007 | Rice et al. |
| 2007/0208619 A1* | 9/2007 | Branam ............ H04N 7/17318 705/14.45 |
| 2007/0214151 A1 | 9/2007 | Scott et al. |
| 2007/0220594 A1 | 9/2007 | Tulsyan |
| 2007/0233599 A1 | 10/2007 | Ganesan et al. |
| 2007/0233759 A1* | 10/2007 | Tomlinson ............ G06F 16/40 708/200 |
| 2007/0234070 A1 | 10/2007 | Horning et al. |
| 2007/0239604 A1 | 10/2007 | O'Connell et al. |
| 2007/0255821 A1 | 11/2007 | Ge et al. |
| 2007/0266257 A1 | 11/2007 | Camaisa et al. |
| 2007/0271466 A1 | 11/2007 | Mak |
| 2007/0294401 A1 | 12/2007 | Shkedi |
| 2007/0297459 A1 | 12/2007 | Cucos et al. |
| 2008/0002725 A1 | 1/2008 | Alicherry et al. |
| 2008/0005394 A1 | 1/2008 | Crooks |
| 2008/0010367 A1 | 1/2008 | Cheng et al. |
| 2008/0010678 A1 | 1/2008 | Burdette et al. |
| 2008/0015988 A1 | 1/2008 | Brown et al. |
| 2008/0021801 A1 | 1/2008 | Song et al. |
| 2008/0040653 A1 | 2/2008 | Levine |

(56) References Cited

U.S. PATENT DOCUMENTS

| | | | |
|---|---|---|---|
| 2008/0040802 A1 | 2/2008 | Pierson et al. | |
| 2008/0043634 A1* | 2/2008 | Wang | H04L 67/1019 |
| | | | 370/252 |
| 2008/0045201 A1* | 2/2008 | Kies | H04W 8/22 |
| | | | 455/420 |
| 2008/0046562 A1 | 2/2008 | Butler | |
| 2008/0049779 A1* | 2/2008 | Hopmann | H04L 12/2807 |
| | | | 370/431 |
| 2008/0052629 A1 | 2/2008 | Phillips et al. | |
| 2008/0098222 A1 | 4/2008 | Zilberman | |
| 2008/0101277 A1 | 5/2008 | Taylor | |
| 2008/0104070 A1 | 5/2008 | Lonchar | |
| 2008/0104672 A1 | 5/2008 | Lunde et al. | |
| 2008/0104684 A1 | 5/2008 | Lunde et al. | |
| 2008/0109307 A1* | 5/2008 | Ullah | H04N 21/25891 |
| | | | 705/14.66 |
| 2008/0120195 A1 | 5/2008 | Shakkarwar | |
| 2008/0120214 A1 | 5/2008 | Steele et al. | |
| 2008/0121690 A1* | 5/2008 | Carani | G06Q 30/02 |
| | | | 235/376 |
| 2008/0126180 A1 | 5/2008 | Ullah | |
| 2008/0133420 A1 | 6/2008 | Barber | |
| 2008/0162200 A1 | 7/2008 | O'Sullivan et al. | |
| 2008/0162202 A1 | 7/2008 | Khanna et al. | |
| 2008/0162475 A1 | 7/2008 | Meggs | |
| 2008/0163128 A1 | 7/2008 | Callanan et al. | |
| 2008/0184355 A1 | 7/2008 | Walrath et al. | |
| 2008/0184372 A1 | 7/2008 | Hoshina | |
| 2008/0189790 A1 | 8/2008 | Park | |
| 2008/0191007 A1 | 8/2008 | Keay | |
| 2008/0201214 A1 | 8/2008 | Aaron | |
| 2008/0204788 A1 | 8/2008 | Kelly et al. | |
| 2008/0222706 A1 | 9/2008 | Renaud et al. | |
| 2008/0235623 A1 | 9/2008 | Li | |
| 2008/0239365 A1 | 10/2008 | Salgado et al. | |
| 2008/0249820 A1 | 10/2008 | Pathria et al. | |
| 2008/0255944 A1 | 10/2008 | Shah | |
| 2008/0281606 A1 | 11/2008 | Kitts | |
| 2008/0281941 A1 | 11/2008 | Park et al. | |
| 2008/0288299 A1 | 11/2008 | Schultz | |
| 2008/0301281 A1 | 12/2008 | Wang et al. | |
| 2008/0306830 A1 | 12/2008 | Lasa et al. | |
| 2008/0313079 A1 | 12/2008 | Van Bosch et al. | |
| 2008/0319774 A1 | 12/2008 | O'Sullivan et al. | |
| 2008/0319841 A1 | 12/2008 | Oliver et al. | |
| 2009/0017805 A1* | 1/2009 | Sarukkai | H04W 28/06 |
| | | | 455/414.3 |
| 2009/0018940 A1 | 1/2009 | Wang et al. | |
| 2009/0024971 A1 | 1/2009 | Willner et al. | |
| 2009/0037602 A1* | 2/2009 | Patel | H04L 61/15 |
| | | | 709/245 |
| 2009/0044279 A1 | 2/2009 | Crawford et al. | |
| 2009/0044282 A1 | 2/2009 | Govindaraju | |
| 2009/0055398 A1 | 2/2009 | Zhu et al. | |
| 2009/0055929 A1 | 2/2009 | Lee et al. | |
| 2009/0070664 A1 | 3/2009 | Gavin et al. | |
| 2009/0089869 A1* | 4/2009 | Varghese | G06Q 20/4014 |
| | | | 726/7 |
| 2009/0106413 A1 | 4/2009 | Salo | |
| 2009/0138590 A1 | 5/2009 | Lee et al. | |
| 2009/0138593 A1 | 5/2009 | Kalavade | |
| 2009/0157417 A1 | 6/2009 | Bradley et al. | |
| 2009/0164269 A1 | 6/2009 | Gupta et al. | |
| 2009/0171760 A1* | 7/2009 | Aarnio | G06Q 30/0269 |
| | | | 705/14.66 |
| 2009/0177692 A1 | 7/2009 | Chagoly et al. | |
| 2009/0183010 A1 | 7/2009 | Schnell et al. | |
| 2009/0187625 A1* | 7/2009 | Blackstock | H04L 12/1818 |
| | | | 709/204 |
| 2009/0205031 A1 | 8/2009 | Sato et al. | |
| 2009/0222308 A1 | 9/2009 | Zoldi et al. | |
| 2009/0228340 A1 | 9/2009 | Bohannon | |
| 2009/0228585 A1 | 9/2009 | Kosbab et al. | |
| 2009/0234738 A1 | 9/2009 | Britton et al. | |
| 2009/0241174 A1 | 9/2009 | Rajan et al. | |
| 2009/0254430 A1* | 10/2009 | Cherenson | G06Q 30/0254 |
| | | | 705/14.12 |
| 2009/0260064 A1 | 10/2009 | Mcdowell et al. | |
| 2009/0265773 A1 | 10/2009 | Schultz | |
| 2009/0271306 A1 | 10/2009 | Pierson | |
| 2009/0307141 A1 | 10/2009 | Kongalath et al. | |
| 2009/0280777 A1 | 11/2009 | Doherty | |
| 2009/0292568 A1 | 11/2009 | Khosravani et al. | |
| 2009/0293128 A1 | 11/2009 | Lippmann et al. | |
| 2009/0296907 A1 | 12/2009 | Vendrow et al. | |
| 2009/0298480 A1* | 12/2009 | Khambete | G06Q 30/0254 |
| | | | 455/414.1 |
| 2009/0307119 A1 | 12/2009 | Ahles et al. | |
| 2009/0313134 A1 | 12/2009 | Faith et al. | |
| 2009/0327333 A1* | 12/2009 | Diener | H04W 16/14 |
| 2010/0005013 A1 | 1/2010 | Uriarte | |
| 2010/0030641 A1 | 2/2010 | Ibenforth | |
| 2010/0030777 A1 | 2/2010 | Panwar et al. | |
| 2010/0057623 A1 | 3/2010 | Kapur et al. | |
| 2010/0057843 A1* | 3/2010 | Landsman | H04L 63/0876 |
| | | | 709/203 |
| 2010/0070606 A1 | 3/2010 | Shenfield et al. | |
| 2010/0082136 A1* | 4/2010 | Rosenblatt | B01D 53/944 |
| | | | 700/94 |
| 2010/0082972 A1 | 4/2010 | Benco et al. | |
| 2010/0094767 A1 | 4/2010 | Miltonberger | |
| 2010/0094768 A1 | 4/2010 | Miltonberger | |
| 2010/0106611 A1 | 4/2010 | Paulsen et al. | |
| 2010/0107225 A1 | 4/2010 | Spencer et al. | |
| 2010/0121716 A1 | 5/2010 | Golan | |
| 2010/0138299 A1 | 6/2010 | Preston et al. | |
| 2010/0145960 A1 | 6/2010 | Casteel et al. | |
| 2010/0153540 A1 | 6/2010 | Li et al. | |
| 2010/0157848 A1 | 6/2010 | Das et al. | |
| 2010/0161424 A1 | 6/2010 | Sylvain | |
| 2010/0161566 A1 | 6/2010 | Adair et al. | |
| 2010/0161728 A1* | 6/2010 | Drozt | H04L 61/1529 |
| | | | 709/204 |
| 2010/0169157 A1 | 7/2010 | Muhonen et al. | |
| 2010/0169192 A1 | 7/2010 | Zoldi et al. | |
| 2010/0192082 A1 | 7/2010 | Sodah | |
| 2010/0199332 A1 | 8/2010 | Bachmann et al. | |
| 2010/0199338 A1 | 8/2010 | Craddock et al. | |
| 2010/0211464 A1 | 8/2010 | Zhu et al. | |
| 2010/0223105 A1 | 9/2010 | Gassewitz et al. | |
| 2010/0223145 A1 | 9/2010 | Dragt | |
| 2010/0228625 A1* | 9/2010 | Priyadarshan | G06Q 30/02 |
| | | | 705/14.49 |
| 2010/0228638 A1 | 9/2010 | Mikan et al. | |
| 2010/0235220 A1* | 9/2010 | Guha | G06Q 30/0254 |
| | | | 705/7.31 |
| 2010/0257065 A1 | 10/2010 | Gupta et al. | |
| 2010/0262467 A1* | 10/2010 | Barnhill, Jr. | H04L 41/12 |
| | | | 709/223 |
| 2010/0274678 A1 | 10/2010 | Rolf et al. | |
| 2010/0293094 A1 | 11/2010 | Kolkowitz et al. | |
| 2010/0306827 A1 | 12/2010 | Esteve Balducci et al. | |
| 2010/0313009 A1 | 12/2010 | Combet et al. | |
| 2010/0321296 A1 | 12/2010 | Gross | |
| 2010/0333170 A1 | 12/2010 | Cox et al. | |
| 2011/0015497 A1* | 1/2011 | Eggenberger | A61B 5/167 |
| | | | 600/301 |
| 2011/0022483 A1 | 1/2011 | Hammad | |
| 2011/0022517 A1 | 1/2011 | Hammad | |
| 2011/0023115 A1 | 1/2011 | Wright | |
| 2011/0029339 A1* | 2/2011 | Callahan | G06Q 10/10 |
| | | | 705/7.29 |
| 2011/0035302 A1 | 2/2011 | Martell et al. | |
| 2011/0047072 A1 | 2/2011 | Ciurea | |
| 2011/0055627 A1* | 3/2011 | Zawacki | H04L 67/14 |
| | | | 714/15 |
| 2011/0082858 A1* | 4/2011 | Yu | G06Q 30/0601 |
| | | | 707/727 |
| 2011/0106610 A1* | 5/2011 | Landis | G06Q 30/02 |
| | | | 705/14.39 |
| 2011/0112901 A1 | 5/2011 | Fried et al. | |

(56) References Cited

U.S. PATENT DOCUMENTS

| | | | |
|---|---|---|---|
| 2011/0119267 A1* | 5/2011 | Forman | G06Q 10/00 707/737 |
| 2011/0153426 A1* | 6/2011 | Reddy | G06Q 30/0261 705/14.58 |
| 2011/0161228 A1 | 6/2011 | Suzuki et al. | |
| 2011/0173281 A1 | 7/2011 | Smith | |
| 2011/0184778 A1 | 7/2011 | Graepel et al. | |
| 2011/0194679 A1 | 8/2011 | Patisaul et al. | |
| 2011/0225091 A1 | 9/2011 | Plastina et al. | |
| 2011/0238575 A1 | 9/2011 | Nightengale et al. | |
| 2011/0251951 A1 | 10/2011 | Kolkowitz et al. | |
| 2011/0258118 A1 | 10/2011 | Ciurea | |
| 2011/0282778 A1 | 11/2011 | Wright et al. | |
| 2011/0288932 A1 | 11/2011 | Marks et al. | |
| 2011/0302087 A1 | 12/2011 | Crooks | |
| 2011/0302096 A1 | 12/2011 | Lowry | |
| 2011/0307341 A1 | 12/2011 | Zohar et al. | |
| 2011/0313847 A1* | 12/2011 | Cao | G06Q 30/0244 705/14.43 |
| 2011/0314557 A1 | 12/2011 | Marshall | |
| 2012/0022883 A1 | 1/2012 | Morrison | |
| 2012/0030757 A1 | 2/2012 | Baikalov et al. | |
| 2012/0030771 A1 | 2/2012 | Pierson et al. | |
| 2012/0036042 A1 | 2/2012 | Graylin et al. | |
| 2012/0036261 A1* | 2/2012 | Salazar | H04L 67/22 709/225 |
| 2012/0041841 A1 | 2/2012 | Hu et al. | |
| 2012/0042361 A1 | 2/2012 | Wong et al. | |
| 2012/0054136 A1 | 3/2012 | Maulik | |
| 2012/0054847 A1 | 3/2012 | Schultz et al. | |
| 2012/0059711 A1* | 3/2012 | Ramer | G06Q 30/0255 705/14.46 |
| 2012/0078708 A1* | 3/2012 | Taylor | G06Q 30/0242 705/14.41 |
| 2012/0084203 A1 | 4/2012 | Mehew et al. | |
| 2012/0084860 A1 | 4/2012 | Cao et al. | |
| 2012/0094639 A1 | 4/2012 | Carlson et al. | |
| 2012/0096076 A1* | 4/2012 | Chan | G06F 9/4856 709/203 |
| 2012/0101939 A1 | 4/2012 | Kasower | |
| 2012/0150742 A1 | 6/2012 | Poon et al. | |
| 2012/0150750 A1 | 6/2012 | Law et al. | |
| 2012/0157062 A1 | 6/2012 | Kim et al. | |
| 2012/0158586 A1 | 6/2012 | Ganti et al. | |
| 2012/0166533 A1 | 6/2012 | Rubinstein et al. | |
| 2012/0173465 A1 | 7/2012 | Hore et al. | |
| 2012/0179558 A1 | 7/2012 | Fischer | |
| 2012/0197981 A1 | 8/2012 | Chan | |
| 2012/0204262 A1 | 8/2012 | Thomas et al. | |
| 2012/0215777 A1* | 8/2012 | Malik | G06F 16/355 707/737 |
| 2012/0215896 A1* | 8/2012 | Johannsen | H04L 41/0853 709/223 |
| 2012/0216282 A1 | 8/2012 | Pappu et al. | |
| 2012/0221404 A1* | 8/2012 | Ahmed | G06Q 30/0261 705/14.39 |
| 2012/0221470 A1 | 8/2012 | Lyon | |
| 2012/0222111 A1 | 8/2012 | Oliver et al. | |
| 2012/0233640 A1* | 9/2012 | Odryna | H04N 21/4622 725/45 |
| 2012/0233665 A1 | 9/2012 | Ranganathan et al. | |
| 2012/0239553 A1 | 9/2012 | Gonen et al. | |
| 2012/0239574 A1 | 9/2012 | Smith et al. | |
| 2012/0239774 A1 | 9/2012 | Tola et al. | |
| 2012/0254320 A1* | 10/2012 | Dove | G16H 10/60 709/206 |
| 2012/0271860 A1* | 10/2012 | Graham, Jr. | G06Q 30/02 707/798 |
| 2012/0278127 A1 | 11/2012 | Kirakosyan et al. | |
| 2012/0278321 A1 | 11/2012 | Traub et al. | |
| 2012/0295580 A1 | 11/2012 | Corner | |
| 2012/0297380 A1 | 11/2012 | Colbert et al. | |
| 2012/0299925 A1* | 11/2012 | Najork | G06T 11/206 345/440 |
| 2012/0311162 A1 | 12/2012 | Paulsen et al. | |
| 2012/0323788 A1 | 12/2012 | Keresman et al. | |
| 2012/0323836 A1 | 12/2012 | Wright et al. | |
| 2012/0324027 A1* | 12/2012 | Vaynblat | G06Q 30/0271 709/206 |
| 2012/0324060 A1* | 12/2012 | Afergan | H04L 67/02 709/219 |
| 2012/0330787 A1 | 12/2012 | Hanson et al. | |
| 2013/0005299 A1* | 1/2013 | Raleigh | H04W 28/0215 455/406 |
| 2013/0006743 A1 | 1/2013 | Moore et al. | |
| 2013/0018789 A1 | 1/2013 | Kaufmann | |
| 2013/0018791 A1 | 1/2013 | Mendicino et al. | |
| 2013/0024300 A1 | 1/2013 | Choudhuri et al. | |
| 2013/0036304 A1 | 2/2013 | Lin et al. | |
| 2013/0040603 A1 | 2/2013 | Stahlberg et al. | |
| 2013/0042298 A1 | 2/2013 | Plaza Fonseca et al. | |
| 2013/0054433 A1* | 2/2013 | Giard | G06F 21/316 705/34 |
| 2013/0055388 A1 | 2/2013 | Thomas et al. | |
| 2013/0073463 A1 | 3/2013 | Dimmick et al. | |
| 2013/0073473 A1 | 3/2013 | Heath | |
| 2013/0080327 A1 | 3/2013 | Baldrick et al. | |
| 2013/0085841 A1 | 4/2013 | Singleton et al. | |
| 2013/0097673 A1 | 4/2013 | Meehan et al. | |
| 2013/0097701 A1 | 4/2013 | Moyle et al. | |
| 2013/0097706 A1* | 4/2013 | Titonis | G06F 21/566 726/24 |
| 2013/0103482 A1 | 4/2013 | Song et al. | |
| 2013/0103629 A1 | 4/2013 | Vaiciulis et al. | |
| 2013/0110623 A1* | 5/2013 | Kilroy | G06Q 30/0271 705/14.53 |
| 2013/0110637 A1 | 5/2013 | Bott | |
| 2013/0111592 A1 | 5/2013 | Zhu et al. | |
| 2013/0117832 A1 | 5/2013 | Gandhi | |
| 2013/0124309 A1* | 5/2013 | Traasdahl | G06Q 30/0241 705/14.49 |
| 2013/0124329 A1 | 5/2013 | Tengler et al. | |
| 2013/0124332 A1* | 5/2013 | Doughty | G06Q 30/0267 705/14.66 |
| 2013/0124333 A1* | 5/2013 | Doughty | G06Q 30/0255 705/14.66 |
| 2013/0144539 A1 | 6/2013 | Allen et al. | |
| 2013/0148525 A1 | 6/2013 | Cuadra Sanchez et al. | |
| 2013/0159192 A1* | 6/2013 | Partridge | G06Q 30/0207 705/50 |
| 2013/0159195 A1 | 6/2013 | Kirillin et al. | |
| 2013/0185764 A1 | 7/2013 | Krstić et al. | |
| 2013/0197998 A1 | 8/2013 | Buhrmann et al. | |
| 2013/0198066 A1 | 8/2013 | Wall et al. | |
| 2013/0204793 A1 | 8/2013 | Kerridge et al. | |
| 2013/0217330 A1* | 8/2013 | Gardenfors | H04M 1/72412 455/41.2 |
| 2013/0226692 A1* | 8/2013 | Kouladjie | G06Q 30/02 705/14.45 |
| 2013/0226717 A1 | 8/2013 | Ahluwalia et al. | |
| 2013/0253965 A1 | 9/2013 | Joseph | |
| 2013/0273879 A1 | 10/2013 | Eisen et al. | |
| 2013/0290119 A1 | 10/2013 | Howe et al. | |
| 2013/0325601 A1* | 12/2013 | Shekhawat | G06Q 30/0241 705/14.49 |
| 2013/0326007 A1* | 12/2013 | Turner | H04W 12/02 709/217 |
| 2013/0339186 A1 | 12/2013 | French | |
| 2013/0339848 A1* | 12/2013 | Patil | G06F 16/1748 715/255 |
| 2014/0019542 A1* | 1/2014 | Rao | G06Q 30/0269 709/204 |
| 2014/0032902 A1 | 1/2014 | Agrawal et al. | |
| 2014/0095320 A1 | 4/2014 | Sivaramakrishnan et al. | |
| 2014/0114821 A1 | 4/2014 | Yoshioka et al. | |
| 2014/0120864 A1 | 5/2014 | Manolarakis et al. | |
| 2014/0122343 A1 | 5/2014 | Einav et al. | |
| 2014/0122697 A1* | 5/2014 | Liu | G06F 16/9535 709/224 |
| 2014/0129322 A1* | 5/2014 | George | G06Q 30/02 705/14.45 |
| 2014/0148197 A1 | 5/2014 | Shields | |

(56) References Cited

U.S. PATENT DOCUMENTS

| | | |
|---|---|---|
| 2014/0180802 A1 | 6/2014 | Boal |
| 2014/0197950 A1 | 7/2014 | Shupp et al. |
| 2014/0258125 A1 | 9/2014 | Gerber et al. |
| 2014/0289867 A1 | 9/2014 | Bukai |
| 2014/0361926 A1 | 12/2014 | Eisen et al. |
| 2015/0026027 A1 | 1/2015 | Priess et al. |
| 2015/0039596 A1* | 2/2015 | Stewart ............. G06F 16/248 707/723 |
| 2015/0046989 A1 | 2/2015 | Oberheide et al. |
| 2015/0088980 A1 | 3/2015 | Lakes et al. |
| 2015/0106198 A1* | 4/2015 | Miller ............. G06Q 30/0251 705/14.52 |
| 2015/0106270 A1 | 4/2015 | Burrell et al. |
| 2015/0120717 A1 | 4/2015 | Kim et al. |
| 2015/0127825 A1 | 5/2015 | Johannsen |
| 2015/0142767 A1* | 5/2015 | Wu ............. G06F 16/951 707/706 |
| 2015/0161207 A1 | 6/2015 | Li et al. |
| 2015/0186901 A1 | 7/2015 | Miltonberger |
| 2015/0188897 A1 | 7/2015 | Grigorovici et al. |
| 2015/0193769 A1 | 7/2015 | Barber |
| 2015/0193821 A1 | 7/2015 | Izumori et al. |
| 2015/0235258 A1* | 8/2015 | Shah ............. G06Q 30/0242 705/14.45 |
| 2015/0235275 A1* | 8/2015 | Shah ............. G06Q 30/0269 705/14.66 |
| 2015/0242861 A9 | 8/2015 | Baldassano |
| 2015/0254658 A1 | 9/2015 | Bondesen et al. |
| 2015/0294316 A1 | 10/2015 | Eisen |
| 2015/0350856 A1 | 12/2015 | Circosta et al. |
| 2015/0370814 A1 | 12/2015 | Liodden et al. |
| 2016/0019546 A1 | 1/2016 | Eisen |
| 2016/0034954 A1 | 2/2016 | Tollinger et al. |
| 2016/0036782 A1 | 2/2016 | Jeffrey et al. |
| 2016/0125461 A1 | 5/2016 | Sivaramakrishnan et al. |
| 2016/0182657 A1* | 6/2016 | Mukherjee ............ H04L 67/303 709/223 |
| 2016/0246581 A1 | 8/2016 | Jimenez et al. |
| 2016/0275545 A1* | 9/2016 | Dasdan ............. G06Q 30/0244 |
| 2016/0321701 A1 | 11/2016 | Tollinger et al. |
| 2017/0039571 A1 | 2/2017 | Eisen |
| 2017/0053208 A1* | 2/2017 | Krishnamurthy ... G06F 16/9024 |
| 2018/0108029 A1 | 4/2018 | Sinha et al. |
| 2018/0121915 A1 | 5/2018 | Britton et al. |
| 2018/0262478 A1 | 9/2018 | Eisen |
| 2018/0322500 A1 | 11/2018 | Eisen |
| 2019/0340642 A1 | 11/2019 | Barber |
| 2019/0370859 A1 | 12/2019 | Traasdahl et al. |
| 2020/0005315 A1 | 1/2020 | Eisen |
| 2020/0013064 A1 | 1/2020 | Eisen |
| 2020/0034845 A1 | 1/2020 | Eisen |
| 2020/0092287 A1 | 3/2020 | Cano et al. |
| 2020/0218763 A1 | 7/2020 | Barber |
| 2020/0219173 A1 | 7/2020 | Eisen |
| 2020/0226186 A1* | 7/2020 | Liodden ............. H04L 67/22 |
| 2020/0294086 A1 | 9/2020 | Traasdahl et al. |
| 2020/0380162 A1 | 12/2020 | Eisen et al. |
| 2021/0224811 A1 | 7/2021 | Eisen |
| 2021/0226950 A1 | 7/2021 | Eisen |
| 2021/0281580 A1 | 9/2021 | Eisen |

FOREIGN PATENT DOCUMENTS

| | | | | |
|---|---|---|---|---|
| EP | 0 923 039 | | 6/1999 | |
| EP | 1 067 792 | | 1/2001 | |
| EP | 1 209 935 | | 5/2002 | |
| EP | 1 256 911 | | 11/2002 | |
| EP | 1 201 070 B1 | | 6/2006 | |
| EP | 1 703 382 | | 9/2006 | |
| EP | 1 197 032 B1 | | 8/2007 | |
| EP | 2 154 891 | | 2/2010 | |
| EP | 2 323 091 A1 | | 5/2011 | |
| EP | 3 583 758 | | 4/2021 | |
| GB | 2 491 101 | | 11/2012 | |
| GB | 2 492 604 | | 1/2013 | |
| JP | 05-257602 | | 10/1993 | |
| JP | 2000-020467 | | 1/2000 | |
| JP | 2000-099250 | | 4/2000 | |
| JP | 2000-137755 | | 5/2000 | |
| JP | 2000-242582 | | 9/2000 | |
| JP | 2000-276281 | | 10/2000 | |
| JP | 2002-007697 | | 1/2002 | |
| JP | 2002-297869 | | 10/2002 | |
| JP | 2002-304568 | A | 10/2002 | |
| JP | 2003-050910 | | 2/2003 | |
| JP | 2005-063216 | | 3/2005 | |
| JP | 2005-115644 | | 4/2005 | |
| JP | 2005-135431 | | 5/2005 | |
| JP | 2006-004333 | | 1/2006 | |
| JP | 2007-018446 | A | 1/2007 | |
| JP | 2007-041642 | A | 2/2007 | |
| JP | 2007-272520 | | 10/2007 | |
| JP | 2007-282249 | | 10/2007 | |
| JP | 2008-022298 | | 1/2008 | |
| JP | 2008-065363 | | 3/2008 | |
| JP | 2008-171315 | | 7/2008 | |
| JP | 2008-535062 | A | 8/2008 | |
| JP | 2008-535124 | | 8/2008 | |
| JP | 2008-242805 | A | 10/2008 | |
| JP | 2008-243008 | | 10/2008 | |
| JP | 2008-257434 | | 10/2008 | |
| JP | 2008-269229 | | 11/2008 | |
| JP | 4202314 | | 12/2008 | |
| JP | 2009-017298 | A | 1/2009 | |
| JP | 2009-048538 | | 3/2009 | |
| JP | 2009-512940 | A | 3/2009 | |
| JP | 2009-122880 | | 6/2009 | |
| JP | 2009-175984 | | 8/2009 | |
| JP | 2009-271661 | A | 11/2009 | |
| JP | 2010-020728 | | 1/2010 | |
| JP | 2010-061254 | | 3/2010 | |
| JP | 2010-122955 | | 6/2010 | |
| JP | 2010-122956 | | 6/2010 | |
| JP | 2010-146153 | A | 7/2010 | |
| JP | 2010-225040 | | 10/2010 | |
| JP | 2010-250664 | | 11/2010 | |
| JP | 2011-065531 | | 3/2011 | |
| JP | 2011-134252 | | 7/2011 | |
| JP | 2011-159264 | A | 8/2011 | |
| JP | 2011-159307 | | 8/2011 | |
| JP | 2011-524560 | A | 9/2011 | |
| JP | 2011-210263 | A | 10/2011 | |
| JP | 2012-234503 | | 11/2012 | |
| JP | 5191376 | | 5/2013 | |
| JP | 5216932 | | 6/2013 | |
| JP | 2015-503148 | A | 1/2015 | |
| KR | 10-1999-0015738 | | 3/1999 | |
| KR | 10-0645983 | | 11/2006 | |
| KR | 10-2008-0044558 | | 5/2008 | |
| KR | 10-2009-0051977 | | 9/2009 | |
| KR | 10-2010-0085888 | | 7/2010 | |
| WO | WO 96/041488 | | 12/1996 | |
| WO | WO 97/003410 | | 1/1997 | |
| WO | WO 99/050775 | | 10/1999 | |
| WO | WO 01/011450 | | 2/2001 | |
| WO | WO 01/033520 | | 5/2001 | |
| WO | WO-0186877 | A2 * | 11/2001 | ............ H04L 43/00 |
| WO | WO 01/095550 | | 12/2001 | |
| WO | WO 01/097134 | | 12/2001 | |
| WO | WO 02/001462 | | 1/2002 | |
| WO | WO 02/071176 | | 9/2002 | |
| WO | WO 02/091226 | | 11/2002 | |
| WO | WO 03/017155 | | 2/2003 | |
| WO | WO 03/025868 | | 3/2003 | |
| WO | WO 03/075197 | | 9/2003 | |
| WO | WO 02/037219 | A9 | 5/2004 | |
| WO | WO 2004/038997 | | 5/2004 | |
| WO | WO 2005/038818 | | 4/2005 | |
| WO | WO 2005/099166 | | 10/2005 | |
| WO | WO 2006/135367 | | 12/2006 | |
| WO | WO 2007/001394 | | 1/2007 | |
| WO | WO 2007/045818 | | 4/2007 | |
| WO | WO 2007/072238 | | 6/2007 | |

(56) References Cited

FOREIGN PATENT DOCUMENTS

| WO | WO 2007/075573 | 7/2007 |
|---|---|---|
| WO | WO 2008/029828 | 3/2008 |
| WO | WO 2008/054849 | 5/2008 |
| WO | WO 2009/132148 | 10/2009 |
| WO | WO 2011/081818 A | 7/2011 |
| WO | WO 2011/104864 A1 | 9/2011 |
| WO | WO 2012/054646 | 4/2012 |
| WO | WO 2012/061801 | 5/2012 |
| WO | WO 2012/142121 | 10/2012 |
| WO | WO 2012/142584 | 10/2012 |
| WO | WO 2013/006538 | 1/2013 |
| WO | WO 2013/070687 A1 | 5/2013 |
| WO | WO 2013/074750 | 5/2013 |
| WO | WO 2013/142722 | 9/2013 |
| WO | WO 2014/022813 | 2/2014 |
| WO | WO 2017/040799 | 3/2017 |
| WO | WO 2018/129373 | 7/2018 |
| WO | WO 2018/151822 | 8/2018 |

OTHER PUBLICATIONS

User Activity Recognition in Smart Homes Using Pattern Clustering Applied to Temporal ANN Algorithm (Year: 2015).*
Usage Patterns in an Urban WiFi Network (Year: 2010).*
Social Applications in the Home Network (Year: 2010).*
International Search Report and Written Opinion from corresponding PCT/US2012/065220 dated Mar. 21, 2013.
International Preliminary Report on Patentability from corresponding PCT/US2012/065220 dated May 30, 2014.
International Search Report and Written Opinion from corresponding PCT/US2016/049930 dated Nov. 9, 2016.
European Examination report dated Aug. 20, 2019 in connection with European Applicatio No. 16766741.9.
Summons to Attend Oral Proceedings dated Mar. 25, 2020 in connection to European Application No. 16766741.9.
[No Author Listed], How does a tracking pixel work? by Quora.
Bourobou et al., User Activity Recognition in Smart Homes Using Pattern Clustering Applied to Temporal ANN Algorithm. Sensors. May 21, 2015; 15: 11953-71.
Marshall, Device Fingerprinting Could Be Cookie Killer. ClickZ. Mar. 2, 2011. http://www.clickz.com/clickz/news/2030243/device-fingerprinting-cookie-killer.
U.S. Appl. No. 13/677,110, U.S. Pat. No. 10,290,017 2013/0124309, Managing Associations Between Device Identifiers, filed Nov. 14, 2012.
U.S. Appl. No. 16/380,794, 2019/0370859, Managing Associations Between Device Identifiers, filed Apr. 10, 2019.
U.S. Appl. No. 16/834,454, 2020/0294086, Managing Associations Between Device Identifiers, filed Mar. 30, 2020.
U.S. Appl. No. 14/842,530, U.S. Pat. No. 10,754,913, System and Method for Analyzing User Device Information, filed Sep. 1, 2015.
Banking Services Newsletter, "Keeping You Up-to-Date on Banking Developments Throughout the UC System", University of California, Office of the President, Banking Services Group, Newsletter 1, Dec. 2005, p. 1.
Bharosa, "Bharosa Authenticator", http://www.bharosa.com/authenticator.html, Jan. 18, 2007, pp. 3.
Bharosa, "Bharosa Announces Online Authentication Solution to Counter Check 21-Based Fraud", http://www.bharosa.com/news/PR-110705.html, Jan. 18, 2007, pp. 2.
Darlin, Damon, "Opening the Door on the Credit Report and Throwing Away the Lock", http://www.nytimes.com/2006/03/18/business/yourmoney/18money.html, The New York Times, Saturday Mar. 18, 2006, pp. 2.
Derfler, Jr. et al, "How Networks Work", Millennium Edition, Que Corporation, Indianapolis, IN, Sep. 2000, pp. 230.
Elkhodr et al., "A Review of Mobile Location Privacy in the Internet of Things", 2012 Tenth International Conference on ICT and Knowledge Engineering, 2012, pp. 266-272.
Gralla, Preston, "How The Internet Works", Millennium Edition, Que Corporation, Indianapolis, IN, Aug. 1999, pp. 329.
Gueye et al., "Constraint-Based Geolocation of Internet Hosts", ACM Internet Measurement Conference 2004, Oct. 25-27, 2004, Taormina, Sicily, Italy, vol. 14, No. 6, pp. 288-293.
"ISO 8583", Wikipedia, http://en.wikipedia.org/wiki/ISO_8583, dated Apr. 13, 2015 in 14 pages.
Kisel et al., "Utilizing a Personalization-Enabled Access Node in Support of Converged Cross-Domain Scoring and Advertising", Bell Labs Technical Journal, 2010, vol. 15, No. 1, pp. 77-94.
Kohno et al., "Remote Physical Device Fingerprinting", Proceedings of 2005 IEEE Symposium on Security and Privacy, May 8-11, 2005, Oakland, CA, pp. 211-225.
Manavoglu et al., "Probabilistic User Behavior Models", ICDM, Third IEEE International Conference on Data Mining, Nov. 19-22, 2003, pp. 203-210.
TechWeb, "Wells Fargo Intros Anti-Theft Alerts", http://www.techweb.com/wire/166404177, Aug. 1, 2005, pp. 1.
The Knightmare, "Secrets of a Super Hacker", Loompanics Unlimited, Port Townsend, Washington, 1994, pp. 233.
"UPIC Marketing Guide—The Clearing House", http://www.upic.com/infofiles/UPIC_Marketing_Guide.pdf, as printed Dec. 19, 2006. pp. 1-16.
White, Ron, "How Computers Work", Millennium Edition, Que Corporation, Indianapolis, IN, Sep. 1999, pp. 284.
Official Communication in European Patent Application No. 05818903.6, dated Dec. 23, 2011.
Official Communication in European Patent Application No. 05818903.6, dated Mar. 18, 2014.
Official Communication in European Patent Application No. 05818903.6, dated Jul. 18, 2017.
Official Communication in European Patent Application No. 19189189.4, dated Jan. 21, 2020.
Official Communication in European Patent Application No. 19189189.4, dated Nov. 19, 2020.
International Search Report and Written Opinion for Application No. PCT/US2005/035532, dated Oct. 29, 2007.
International Preliminary Report on Patentability and Written Opinion for Application No. PCT/US2005/035532, dated Jan. 9, 2008.
Official Communication in European Patent Application No. 6845722.5, dated Mar. 13, 2009.
Official Communication in European Patent Application No. 19181057.1, dated Sep. 17, 2019.
Official Communication in European Patent Application No. 8159110.9, dated Oct. 27, 2008.
Official Communication in European Patent Application No. 8159110.9, dated Mar. 22, 2010.
Summons to Attend Oral Proceedings received in European Application No. EP08159110, dated Jul. 23, 2020.
International Search Report and Written Opinion for Application No. PCT/US2006/048251, dated Feb. 26, 2008.
International Preliminary Report on Patentability and Written Opinion for Application No. PCT/US2006/048251, dated Jun. 18, 2008.
International Search Report and Written Opinion for Application No. PCT/US2007/065776, dated Jul. 3, 2008.
International Preliminary Report on Patentability and Written Opinion for Application No. PCT/US2007/065776, dated Sep. 30, 2008.
International Search Report and Written Opinion received in PCT Application No. PCT/US2005/020750, dated Jun. 13, 2008.
International Preliminary Report on Patentability and Written Opinion received in PCT Application No. PCT/US2005/020750, dated Jul. 1, 2008.
Official Communication in European Patent Application No. 08165224.0, dated Nov. 15, 2010.
Supplementary European Search Report for Application No. EP09735653, dated Dec. 28, 2011.
Official Communication for Application No. EP09735653, dated Jan. 4, 2013.
Summons to Attend Oral Proceedings received in European Application No. EP09735653, dated Oct. 7, 2016.
International Search Report and Written Opinion for Application No. PCT/US2009/041462, dated Dec. 1, 2009.

(56) References Cited

OTHER PUBLICATIONS

International Preliminary Report on Patentability and Written Opinion for Application No. PCT/US2009/041462, dated Nov. 4, 2010.
International Search Report and Written Opinion for Application No. PCT/US2011/056948, dated Apr. 18, 2012.
International Preliminary Report on Patentability in Application No. PCT/US2011/056948, dated May 2, 2013.
International Search Report and Written Opinion for Application No. PCT/US2013/033357, dated Jul. 10, 2013.
International Preliminary Report on Patentability in Application No. PCT/US2013/033357, dated Sep. 23, 2014.
International Search Report and Written Opinion for Application No. PCT/US2013/053495, dated Nov. 22, 2013.
International Preliminary Report on Patentability in Application No. PCT/US2013/053495, dated Feb. 3, 2015.
International Search Report and Written Opinion for Application No. PCT/US2013/070146, dated Mar. 3, 2014.
International Preliminary Report on Patentability in Application No. PCT/US2013/070146, dated May 28, 2015.
Official Communication received in European Patent Application No. 21154719.5, dated Jun. 15, 2021.
Provisional Application as filed in U.S. Appl. No. 61/324,312, dated Apr. 15, 2010 in 15 pages.

\* cited by examiner

| Website/App | Count |
|---|---|
| abc.com | 3 |
| MyWeatherAndroidApp | 3 |
| MyFavoriteAndroidGameApp | 4 |
| def.com | 6 |
| xyz.net | 4 |
| awesomeSite.com | 3 |
| 123.com | 5 |
| bestSite.net | 2 |

FIG. 10

| Co-Occurance Counts | abc.com | MyWeather AndroidApp | MyFavorite AndroidGameApp | def.com | xyz.net | awesomeSite.com | 123.com | bestSite.net |
|---|---|---|---|---|---|---|---|---|
| abc.com | 3 | 2 | 2 | | | 1 | | |
| MyWeather AndroidApp | 2 | 3 | 2 | | | | | |
| MyFavorite AndroidGameApp | 2 | 2 | 4 | | | | | |
| def.com | | | | 6 | 4 | | 5 | |
| xyz.net | | | | 4 | 4 | | 4 | |
| awesomeSite.com | 1 | | | | | 3 | | 1 |
| 123.com | | | | 5 | 4 | | 5 | |
| bestSite.net | | | | | | 1 | | 2 |

FIG. 11

| PEARSON | abc.com | MyWeather AndroidApp | MyFavorite AndroidGameApp | def.com | xyz.net | awesomeSite.com | 123.com | bestSite.net |
|---|---|---|---|---|---|---|---|---|
| abc.com | 1.0 | 0.52 | 0.76 | -0.80 | -0.53 | 0.048 | -0.654 | -0.33 |
| MyWeather AndroidApp | 0.52 | 1.0 | 0.36 | -0.80 | -0.53 | -0.43 | -0.65 | -0.33 |
| MyFavorite AndroidGameApp | 0.76 | 0.36 | 1.0 | -1.0 | -0.67 | -0.53 | -0.82 | -0.41 |
| def.com | -0.80 | -0.80 | -1.0 | 1.0 | 0.66 | 0.80 | 0.82 | -0.61 |
| xyz.net | -0.53 | -0.53 | -0.67 | 0.66 | 1.0 | -0.53 | 0.82 | -0.41 |
| awesomeSite.com | 0.048 | -0.43 | -0.53 | -0.80 | 0.82 | 1.0 | -0.65 | 0.22 |
| 123.com | -0.654 | -0.65 | -0.82 | 0.82 | -0.41 | -0.65 | 1.0 | -0.5 |
| bestSite.net | -0.33 | -0.33 | -0.41 | -0.61 | -0.41 | 0.22 | -0.5 | 1.0 |

FIG. 12

| context1 | context2 | pearson |
|---|---|---|
| abc.com | MyFavoriteAndroidGameApp | 0.76 |
| def.com | xyz.net | 0.66 |
| 123.com | def.com | 0.82 |
| 123.com | xyz.net | 0.82 |

FIG. 13

| context1 | context2 | pearson |
|---|---|---|
| def.com | xyz.net | 0.66 |
| 123.com | def.com | 0.82 |
| 123.com | xyz.net | 0.82 |

FIG. 14

| PEARSON Matrix (Bots Removed) | abc.com | MyWeather AndroidApp | MyFavorite AndroidGameApp | awesomeSite.com | bestSite.net |
|---|---|---|---|---|---|
| abc.com | 1.0 | 0.52 | 0.76 | 0.048 | -0.33 |
| MyWeather AndroidApp | 0.52 | 1.0 | 0.36 | -0.43 | -0.33 |
| MyFavorite AndroidGameApp | 0.76 | 0.36 | 1.0 | -0.53 | -0.41 |
| awesomeSite.com | 0.048 | -0.43 | -0.53 | 1.0 | 0.22 |
| bestSite.net | -0.33 | -0.33 | -0.41 | 0.22 | 1.0 |

FIG. 15

| SVD (Dimensionality Reduced) M Matrix for Specific Platform Pair (Phone/AndroidTablet) | abc.com | MyWeather AndroidApp | MyFavorite AndroidGameApp | awesomeSite.com | bestSite.net |
|---|---|---|---|---|---|
| new_feature_a | -0.2531113127 | -0.192333193 | -0.185811128 | 0.12393018 | 0.921443011 |
| new_feature_b | -0.589546433 | 0.110297658 | -0.047519701 | -0.797691934 | 0.041217552 |
| new_feature_c | 0.479684717 | 0.453993327 | 0.546527448 | -0.344092471 | -0.38301534 |

*FIG. 16*

| FEATURE VECTORS fv | fv(node1) | fv(node2) |
|---|---|---|
| abc.com | 1.0 | 0 |
| MyWeatherAndroidApp | 0 | 1.0 |
| MyFavoriteAndroidGameApp | 0 | 1.0 |
| awesomeSite.com | 0 | 0 |
| bestSite.net | 0 | 0 |

*FIG. 17*

| M*Feature Vector | M*fv(node1) | M*fv(node2) |
|---|---|---|
| new_feature_a | -0.2531 | -0.3782 |
| new_feature_b | -0.589 | 0.06277 |
| new_feature_c | 0.4797 | 1.0005 |

FIG. 18

| Normalized M*Feature Vector | Normalized M*fv(node1) | Normalized M*fv(node2) |
|---|---|---|
| new_feature_a | -0.316 | -0.353 |
| new_feature_b | -0.7359 | 0.0586 |
| new_feature_c | 0.599 | 0.9338 |

FIG. 19

| TrueScore | WinRate (Fraction of Time this Score Beats a False Score) |
| --- | --- |
| 0 | 0.10 |
| 0.1 | 0.16 |
| 0.2 | 0.24 |
| 0.3 | 0.36 |
| 0.4 | 0.49 |
| 0.5 | 0.63 |
| 0.6 | 0.75 |
| 0.7 | 0.84 |
| 0.8 | 0.90 |
| 0.9 | 0.94 |
| 1.0 | 0.96 |

FIG. 20

| Plat1 | Plat2 | h( trueScore, Plat1, Plat2 ) |
|---|---|---|
| computer | computer | 0.5 |
| computer | computer | 0.1 |
| computer | computer | 0.8 |
| computer | computer | 0.95 |
| computer | computer | 0.35 |
| android | ipad | 1.0 |
| android | ipad | 0.5 |
| android | ipad | 0.6 |
| android | ipad | 0.45 |
| android | ipad | 0.2 |
| ipad | iphone | 0.6 |
| ipad | iphone | 0.3 |
| ipad | iphone | 0.75 |
| ipad | iphone | 0.9 |
| ipad | iphone | 0.9 |

FIG. 22

| Plat1 | Plat2 | h(rawScore, Plat1, Plat2) |
|---|---|---|
| computer | computer | 0.5 |
| computer | computer | 0.1 |
| computer | computer | 0.5 |
| computer | computer | 0.8 |
| computer | computer | 0.35 |
| computer | computer | 0.35 |
| computer | computer | 0.1 |
| computer | computer | 0.8 |
| computer | computer | 0.95 |
| computer | computer | 0.95 |
| android | ipad | 0.6 |
| android | ipad | 0.2 |
| ipad | iphone | 0.75 |
| ipad | iphone | 0.3 |
| ipad | iphone | 0.3 |
| ipad | iphone | 0.6 |
| ipad | iphone | 0.3 |
| ipad | iphone | 0.75 |
| ipad | iphone | 0.3 |
| ipad | iphone | 0.9 |

FIG. 23

| Plat1 | Plat2 | h(rawScore, Plat1, Plat2) |
|---|---|---|
| computer | computer | 0.1 |
| computer | computer | 0.1 |
| android | ipad | 0.2 |
| ipad | iphone | 0.3 |
| ipad | iphone | 0.3 |
| ipad | iphone | 0.3 |
| ipad | iphone | 0.3 |
| computer | computer | 0.35 |
| computer | computer | 0.35 |
| computer | computer | 0.5 |
| computer | computer | 0.5 |
| android | ipad | 0.6 |
| ipad | iphone | 0.6 |
| ipad | iphone | 0.75 |
| ipad | iphone | 0.75 |
| computer | computer | 0.8 |
| computer | computer | 0.8 |
| ipad | iphone | 0.9 |
| computer | computer | 0.95 |
| computer | computer | 0.95 |

FIG. 24

| hValue Range | correspondingBin |
|---|---|
| noCall/noFeatures | 0 |
| 0-0.1 | 1 |
| 0.1-0.3 | 2 |
| 0.3-0.3 | 3 |
| 0.3-0.35 | 4 |
| 0.35-0.5 | 5 |
| 0.5-0.6 | 6 |
| 0.6-0.75 | 7 |
| 0.75-0.8 | 8 |
| 0.8-0.9 | 9 |
| 0.9+ | 10 |

*FIG. 25*

| Normalized M*Feature Vector | Normalized M*fv(node1) | Normalized M*fv(node2) |
|---|---|---|
| new_feature_a | -0.316 | -0.353 |
| new_feature_b | -0.7359 | 0.0586 |
| new_feature_c | 0.599 | 0.9338 |

*FIG. 26*

SYSTEM AND METHOD FOR ANALYZING USER DEVICE INFORMATION

RELATED APPLICATIONS

This application is a continuation of U.S. patent application Ser. No. 14/842,530, filed Sep. 1, 2015, entitled "SYSTEM AND METHOD FOR ANALYZING USER DEVICE INFORMATION"; which is a continuation-in-part of U.S. patent application Ser. No. 13/677,110 entitled "MANAGING ASSOCIATIONS BETWEEN DEVICE IDENTIFIERS" filed Nov. 14, 2012 which is a non-provisional application of and claims priority under 35 U.S.C. § 119(e) to U.S. Provisional App. No. 61/559,879, filed Nov. 15, 2011, U.S. Provisional App. No. 61/563,277, filed Nov. 23, 2011 and U.S. Provisional App. No. 61/563,963, filed Nov. 28, 2011, of which applications are incorporated herein by reference by their entirety.

BACKGROUND

There are many systems that are used to analyze behaviors of users within distributed communication networks such as the Internet. In particular, there are systems that track user behavior of computing devices such as PCs, mobile devices, gaming consoles, among others. Such behavior is used typically to determine the display of advertising to users of these devices by online advertising systems. For example, advertisements such as banner ads, text, images, audio, video, or other media may be displayed to a user based on their behavior. Techniques such as using cookies, pixels, among others may be used to track how users interact with applications, websites, and other forms of content and store information relating to particular users' behavior. Advertising systems may use such behavior information to specifically target particular users and deliver customized advertising content to particular users. Because such content is targeted to a particular user, the likelihood that the particular advertising message is successful is increased.

SUMMARY

It is realized that although such conventional techniques are used to track user behavior of devices, such techniques do not permit advertisers to track users across applications and devices. It is appreciated that different application programs on a same computing device appear as different devices to server-based systems that provide and track advertisements to computing devices of users. It would be useful to provide systems that can track user behavior among multiple computing devices, such as a mobile device, a PC, television, gaming device, or other system. For instance, such a system may more accurately track and model a user's behavior and more effectively target the user among multiple devices.

Also, it is appreciated that different users may use a single computing device, and methods for discerning between different users may be useful. For instance, there may be, within a single household, a number of different users that use the same computing devices. It would be useful to discern between such individuals for the purpose of delivering targeted advertising to these users. For example, one user may be interested in football (e.g., is a fan of the Buffalo Bills), yet another user may not be interested in football at all, and an advertising message targeted to a football fan may not be appropriate or effective in reaching this other user.

According to one aspect of the present invention, behavioral information (e.g., website "signings" of a user, application "sightings," etc.) may be used to determine contexts of particular users in order to determine, within a connected network of devices, which devices exhibit similar behavior, and thus the devices should be grouped together and/or may exhibit use by a common user that operates multiple devices. Such contexts may be clustered together to determine similar contexts. For instance, certain behaviors may be grouped together for a particular device or node or group of nodes within the distributed network as represented by a device graph. The device graph includes a representation of devices in the network with connections being formed between the devices, these connections indicating their level of how closely they are related.

Further, such contexts may be propagated to a model of other devices that are determined to be neighbors of the device. A correlation matrix (e.g., a Pearson correlation matrix) may be created using the propagated contexts to determine what behavior among connected nodes of the network provide the highest correlation of behavior (e.g., as determined by site visits/app usage). Such propagated contexts may be used to "train" a scoring engine. In one embodiment, the system determines relative correlations between systems. It is also appreciated that some highly correlated apps/sites may be fraudulent, activity that is common among platforms and can be attributed to bots, or is at an interest level that is high and therefore is commonly correlated among devices as a result of being popular (and is therefore not a good indication of distinctiveness or similarity). For instance, the site "abc.com" is a commonly accessed site that could be removed as not being distinctive among multiple devices.

For two particular platform pairs of devices within the device graph (e.g., an iPhone and an Android tablet) a reduced matrix may be derived. A system may use this reduced matrix to multiply feature vectors (e.g., by a dot product) derived from behavior observed at a device to determine a raw score for an edge within the device graph. These raw scores may be mapped to an actual score using bins. The score may be recorded for a particular model of a device graph, indicating that for the particular platform pair, the platforms are related (or not). Such information may be used to indicate device use to a user (e.g., for monitoring or other function), may be used to perform some action or series of actions (e.g., determine display(s) of advertising on one or more devices), determine whether certain users are similar or dissimilar to other users, or to perform some other evaluation or indication. In one embodiment, sighting data from website visits, application use, or other behavioral data is used as a basis to determine similarity between users across multiple devices. In one embodiment, sighting data is used in association with a device graph to determine similarity. In one instance, sighting data is propagated to other nodes within the device graph to which other nodes are connected.

Sighting data is compared and propagated to different nodes of the device graph. Such sighting behavior or context among the nodes is grouped together in clusters. Contexts are propagated and joint probabilities are calculated for particular contexts. Attribution matrices are determined for the propagated contexts within the graph. In a scoring procedure, the attribution matrix and determined scope mappings may be used to classify and score future behavioral sighting data. In particular, the system may determine a feature vector based on the behavioral data and multiply that vector by the determined attribution matrix to determine a score that indicates similarity. Such similarity scores may be used to determine how similar or dissimilar particular users are from one another or to identify users that operate across connected devices.

It is appreciated that most companies that provide products and services have adopted consumer-based approaches to running their businesses. Such companies spend marketing dollars for three basic functions to execute on this strategy. These include (1) acquisition via paid media, (2) personalization of content for particular advertising targets (e.g., consumers), and (3) analytics of the effectiveness of the acquisition and the personalization. Aspects of the present invention allow companies (e.g., advertisers) to perform these functions with more precision by allowing an understanding of which individuals are interacting with a brand versus how a device or household is interacting with a brand.

For example, relating to an acquisition activity, a marketer may want to show a paid advertisement to someone who is in their target audience. For instance, Home Depot may want to show an advertisement promoting garden tools that are on sale to someone who actively maintains a garden. Home Depot may be forced to show an advertisement only to devices where they can discern the user is a gardener (which may be a subset of that users actual devices) or show an ad to everyone in the household of a gardener (which would potentially target users who have no interest in garden tool). According to one aspect of the present invention, a system is provided that has the ability to more precisely target a single user on all of their devices.

In another example relating to personalization, using the previous example above, Home Depot might want to show a promotion for this sale to the gardener when the gardener visits the Home Depot home page. They would fail to show the message correctly to the user if using only device level information and would show the wrong promotion by using household level information. Rather, according to one aspect of the present invention, a system is provided that can correctly target the gardener user on a particular device within a household.

The same principles may be applied from an analytics perspective. In the case of looking at the device level, a user may see an ad for the Home Depot promotion on their phone, but ultimately buys the gardening tools on their desktop. Without a way of relating activity between devices by the user, the phone ad is not given any credit for influencing the purchasing decision. When looking at the household level, a different person may have seen the ad versus some other person who purchased the gardening tools, therefore overvaluing the effectiveness of the ad. Rather, according to one aspect of the present invention, a system is provided that provides a true view of the consumer level effectiveness of Home Depot's marketing spend.

According to one aspect of the present invention, a system is provided comprising a database adapted to store sighting data relating to one or more devices connected in a device graph, and a scoring engine adapted to score one or more edges of the device graph connecting the one or more devices wherein the score of at least one of the one or more edges is determined based upon the sighting data. According to one embodiment, the sighting data includes at least one portion of data identifying a user access to a website. According to one embodiment, the sighting data includes at least one portion of data identifying a user access to an application program. According to another embodiment, the system further comprises a component adapted to train a component of the scoring engine using at least one portion of the sighting data.

According to one embodiment, the component adapted to train a component of the scoring engine using the at least one portion of the sighting data is adapted to propagate sighting data between connected nodes within the device graph. According to one embodiment, the system further comprises a component adapted to determine a correlation between connected nodes within the device graph based on the at least one portion of the sighting data. According to one embodiment, the component adapted to determine a correlation is adapted to determine a Pearson correlation matrix based on the propagated sighting data between connected nodes within the device graph. According to another embodiment, the connected nodes within the device graph are different computer platforms.

According to one embodiment, the system further comprises a component that is adapted to reduce a volume of sighting data by grouping similar sighting data. According to one embodiment, the system further comprises a component that is adapted to eliminate fraudulent data within the sighting data. According to one embodiment, the scoring engine is adapted to score one or more edges of the device graph connecting the one or more devices responsive to the training of the component of the scoring engine using the at least one portion of the sighting data. According to another embodiment, the system further comprises an interface that indicates the score. According to yet another embodiment, the system further comprises a component that is adapted to perform an action using a computer system responsive to the determined score.

According to another aspect of the present invention, a method is provided comprising acts of maintaining, in a memory of a computer system, a device graph including a representation of a plurality of devices connected by one or more edges, storing sighting data relating to the one or more devices connected in the device graph, and scoring, by a scoring engine, one or more edges of the device graph connecting the one or more devices wherein the act of scoring at least one of the one or more edges is determined based upon the sighting data. According to one embodiment, the sighting data includes at least one portion of data identifying a user access to a website. According to one embodiment, the sighting data includes at least one portion of data identifying a user access to an application program. According to one embodiment, the system further comprises an act of training, by a component of the scoring engine, using at least one portion of the sighting data. According to another embodiment, the system further comprises an act of propagating sighting data between connected nodes within the device graph.

According to one embodiment, the system further comprises an act of determining, by a correlation component, a correlation between connected nodes within the device graph based on the at least one portion of the sighting data. According to one embodiment, the system further comprises an act of determining, by the correlation component, a Pearson correlation matrix based on the propagated sighting data between connected nodes within the device graph. According to one embodiment, the connected nodes within the device graph are different computer platforms. According to another embodiment, the system further comprises an act of reducing a volume of sighting data responsive to an act of grouping similar sighting data.

According to one embodiment, the system further comprises an act of eliminating fraudulent data within the sighting data. According to one embodiment, the system further comprises an act of scoring, but the scoring engine, one or more edges of the device graph connecting the one or more devices responsive to the training of the component of the scoring engine using the at least one portion of the sighting data. According to one embodiment, the system further comprises an act of indicating, by a computer-based interface, the score of the one or more edges of the device graph. According to another embodiment, the system further comprises an act of performing, by a computer system, responsive to the determined score.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 10 shows an example of website and application usage that may be analyzed according to one embodiment of the present invention;

FIG. 11 shows a chart that may be created that counts a number of co-occurrences of various website and application accesses according to one embodiment of the present invention;

FIG. 12 shows a Pearson matrix for the example according to one embodiment of the present invention;

FIG. 13 shows a chart of highly correlated entries that may be removed from the matrix according to one embodiment of the present invention;

FIG. 14 shows a chart showing remaining sites of the matrix according to one embodiment of the present invention;

FIG. 15 shows a Pearson matrix for the example with bot sites removed according to one embodiment of the present invention;

FIG. 16 shows an example "M" matrix according to one embodiment of the present invention;

FIG. 17 shows an example binary feature matrix according to one embodiment of the present invention;

FIG. 18 shows an example feature matrix according to one embodiment of the present invention;

FIG. 19 shows a normalized feature vector matrix according to one embodiment of the present invention;

FIG. 20 shows a chart that shows a fraction of time a score may win for a particular raw score value according to one embodiment of the present invention;

FIG. 22 shows a chart showing true scores for platform pairs according to one embodiment of the present invention;

FIG. 23 shows a chart showing random binning sampling with replacement according to one embodiment of the present invention;

FIG. 24 shows a sorted version of the chart in FIG. 23 according to one embodiment of the present invention;

FIG. 25 shows an example bin mapping according to one embodiment of the present invention; and FIG. 26 shows a normalized feature vector according to one embodiment of the present invention.

DETAILED DESCRIPTION

As described above, it may be useful to track users across applications and devices, and to distinguish similar or different users among a number of commonly-used devices. Accordingly, systems and methods are provided for analyzing user device information to determine different users among a number of devices. In particular, user's behavior when using the devices is observed, and responsive to that observed behavior, is the determined whether a particular users are distinguishable from other users. For instance, it may be useful to distinguish between users that operate the same devices or exist within a similar network (e.g., a home network, a workplace network, etc.) for various purposes. For instance, it may be useful to distinguish between users for displaying advertising to these users, performing some other operation with respect to a subset of the users.

Figure 1:
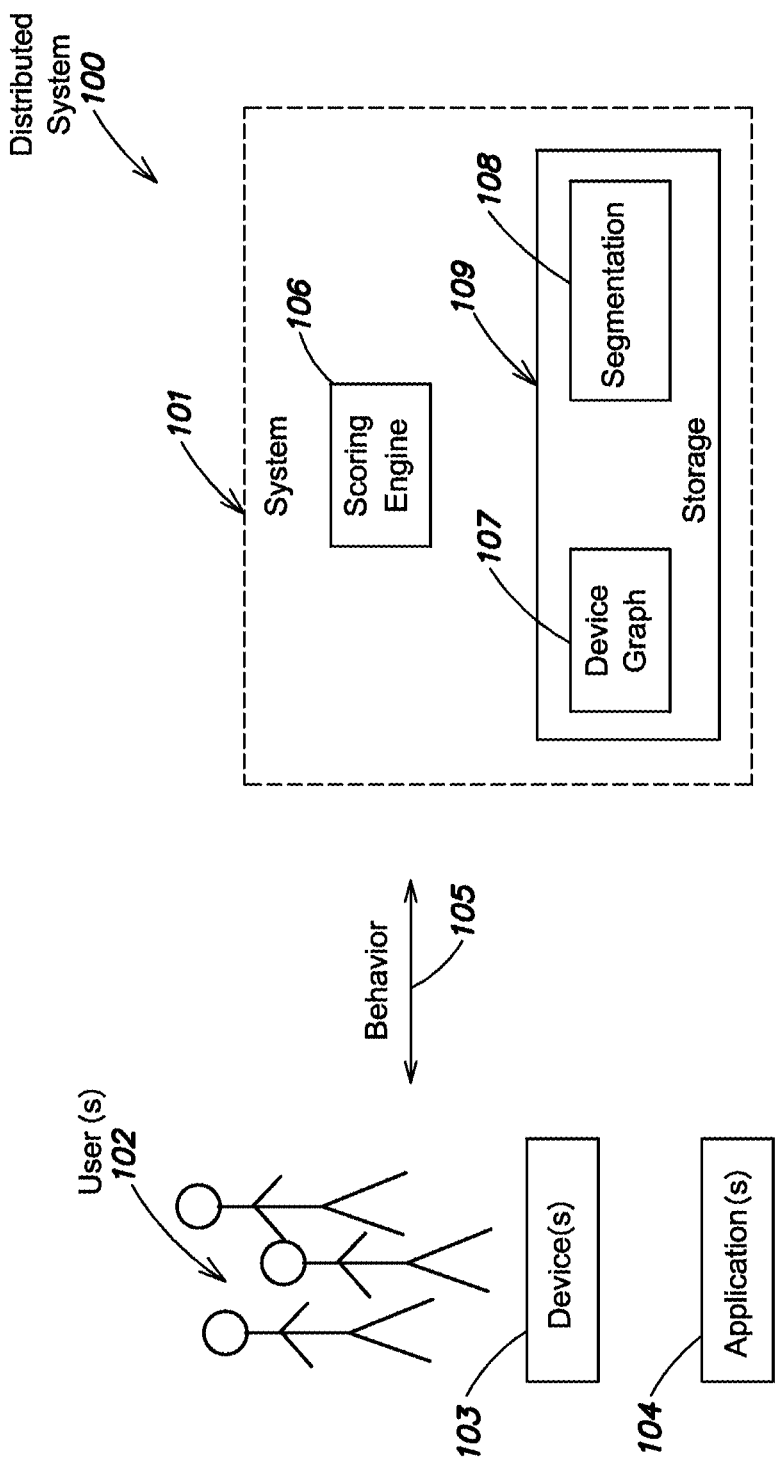
FIG. 1 is a block diagram showing a system for analyzing user device information according to various aspects of the present invention.

FIG. 1 shows a distributed system 100 including one or more users 102 that operate one or more devices 103 that execute one or more applications 104. For instance, users 102 may operate one or more PCs, mobile devices, or other computing device that accesses a communication network (e.g., the Internet). Such devices may have one or more applications (e.g., applications 104) that communicate with one or more systems within a distributed system 100. Such applications may include, for example, a browser application, another type of application that communicates with one or more systems, or any other application that can collect behavior (e.g. behavior 105) of the user.

Such devices may communicate with a system 101 that is capable of observing such behavior. System 101 may include one or more processing engines including, but not limited to, scoring engine 106 that is capable of determining a similarity score for particular users. System 101 may also include a storage entity 109 on which data may be stored associated with system 101. For instance, system 101 may create and maintain a device graph 107 that identifies, based on collective behavior information, access patterns between devices, users, and other entities. Storage 109 may also include segmentation information 108 which identifies particular collections of devices, users and other entities that are recognized from system 101 as being similar.

Figure 2:
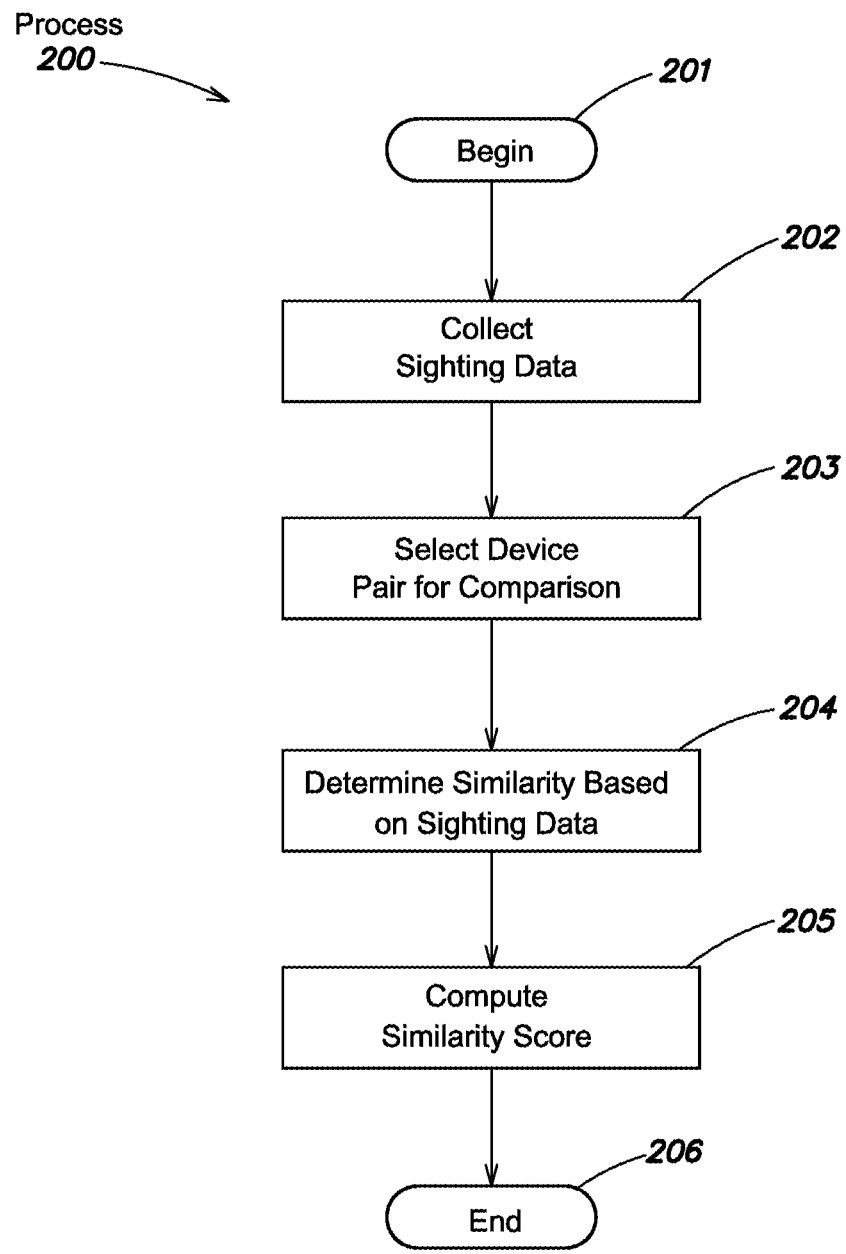
FIG. 2 shows an example process for analyzing user device information according to one embodiment of the present invention.

FIG. 2 shows a process 200 for analyzing user device information according to one embodiment of the present invention. At block 201, process 200 begins. At block 202, the system (e.g., system 101) collects sighting data for one or more users. For instance, such sighting data may include, for example, application use information by one or more users, website visits within a browser program performed by one or more users, or any other behavioral information that could be collected from a computing device that indicates user behavior. A sighting may include, for example, an observation of a device with a given context at a particular time.

For instance, a website sighting may be an observation (e.g., by a system) that a particular device visited a website. For instance, device abc was observed on website www.tapad.com at 13:00 on Jan. 1, 2015. An application or app sighting might include a sighting (e.g., by the device or other system) of an app on a device. For example, use of the Yelp app was observed on device abc on Jan. 1, 2015.

At block 203, the system selects a device pair for comparison. At block 204, the system determines a similarity between behavioral data based on the sighting data collected. The system then may compute a similarity score between the devices, based on the sighting data at block 205. At block 206, process 200 ends.

Figure 3:
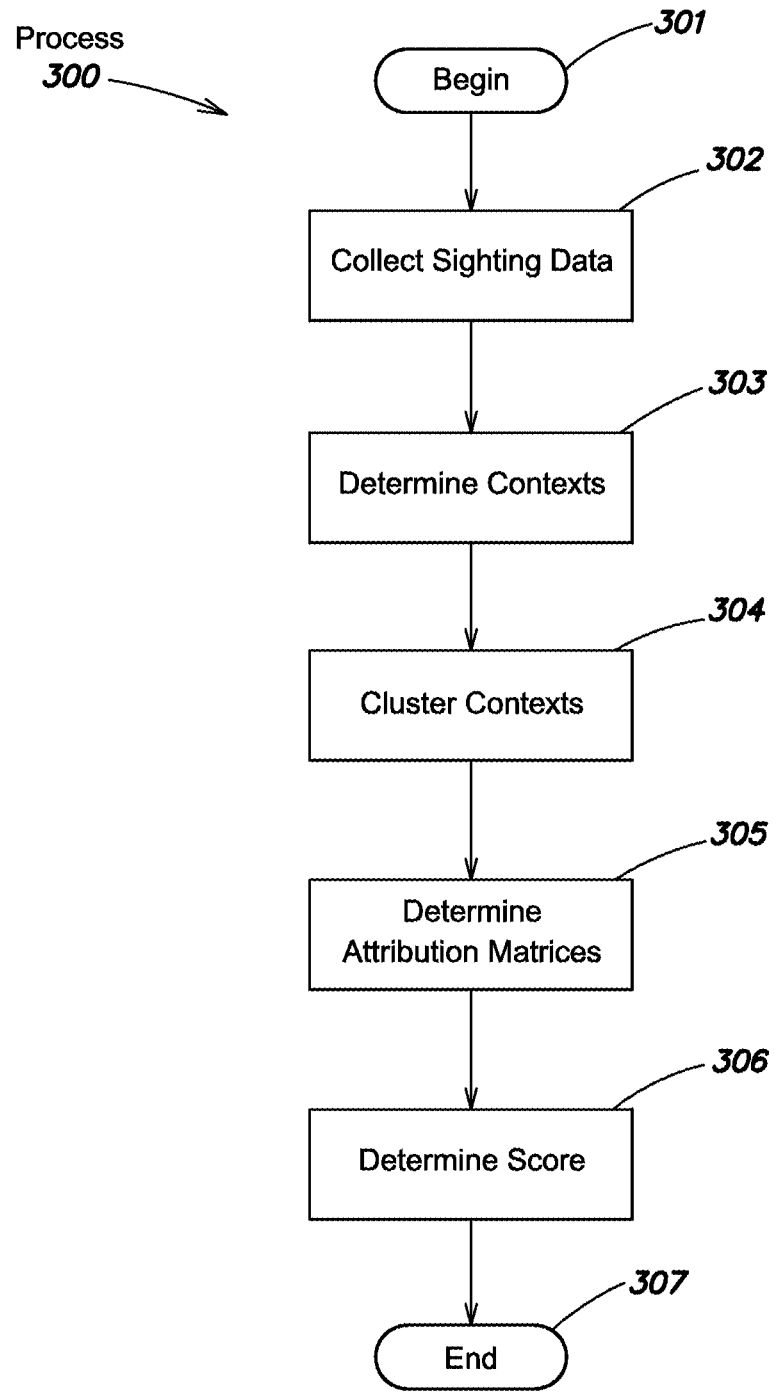
FIG. 3 shows another example process for analyzing user device information according to one embodiment of the present invention.

FIG. 3 shows a process 300 for analyzing device data according to one embodiment of the present invention. At block 301, process 300 begins. At block 302, the system (e.g., system 101) collects sighting data as discussed above with reference to FIG. 2. At block 303, the system determines one or more contexts associated with a particular device. At block 304, the contexts may be clustered into groups at block 304. At block 305, the system determines attribution matrices associated with the contexts. Based on the attribution matrices, the system may determine a score at block 306 for a particular device. At block 307, process 300 ends.

Figure 4:
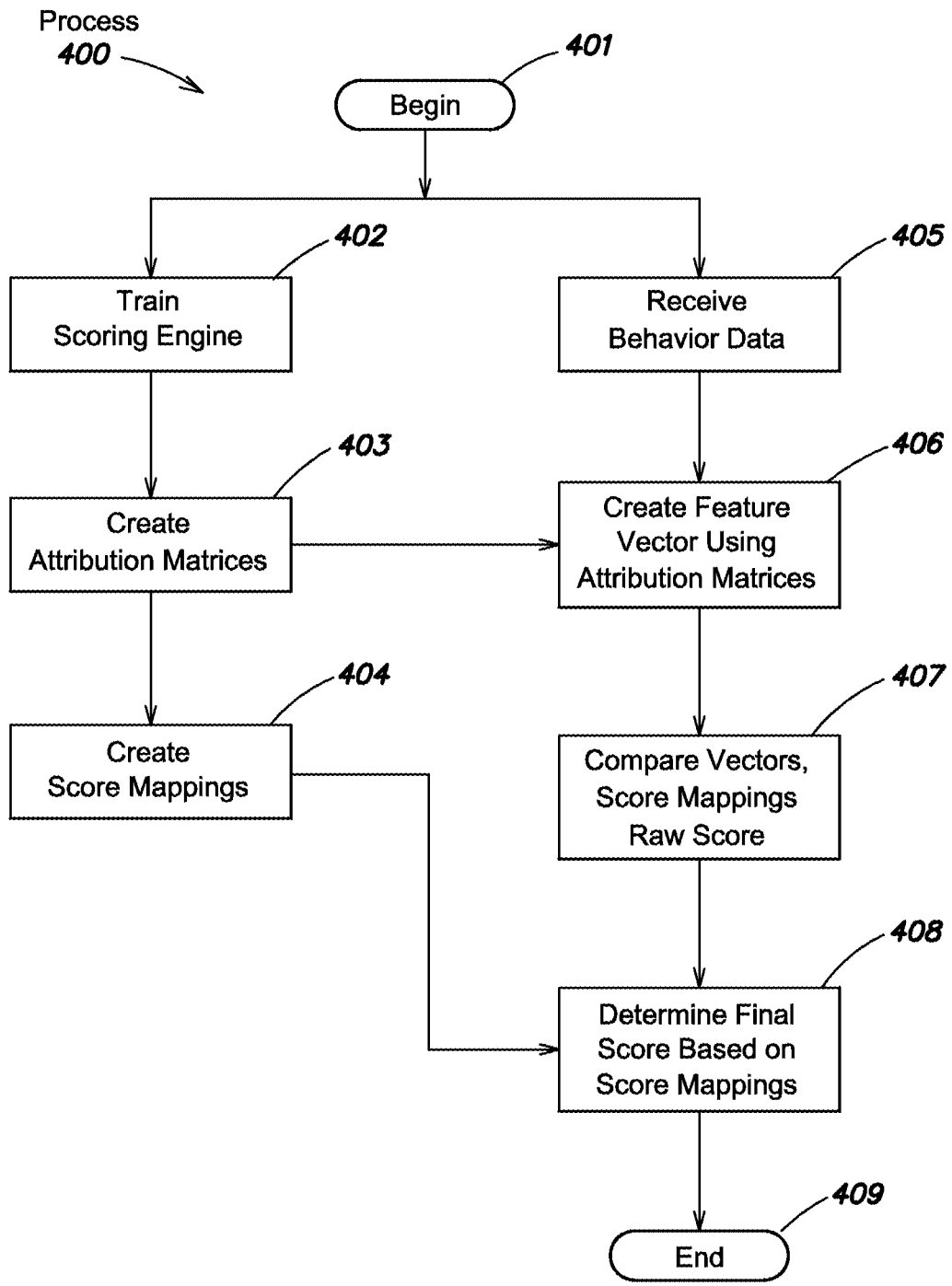
FIG. 4 shows another example process for analyzing user device information according to one embodiment of the present invention.

FIG. 4 shows a process for analyzing device information according to one embodiment of the present invention. At block 401, process 400 begins. The process may include one or more aspects that relate to training a scoring engine (e.g., scoring engine 106). At block 402, the system trains a scoring engine based on sighting information collected for one or more devices. At block 403, the system may create attribution matrices. At block 404, the system creates score mappings which may be used to produce scores based on received data. After training is performed, the system may receive behavior data for one or more users at block 405. At block 406, the system may create a feature vector using the attribution matrices determined within the training process. A block 407, the system compares vectors and score mappings to create a raw score based on the behavior. At block 408, the system determines a final score based on score mappings. At block 409, process 400 ends.

Figure 5:
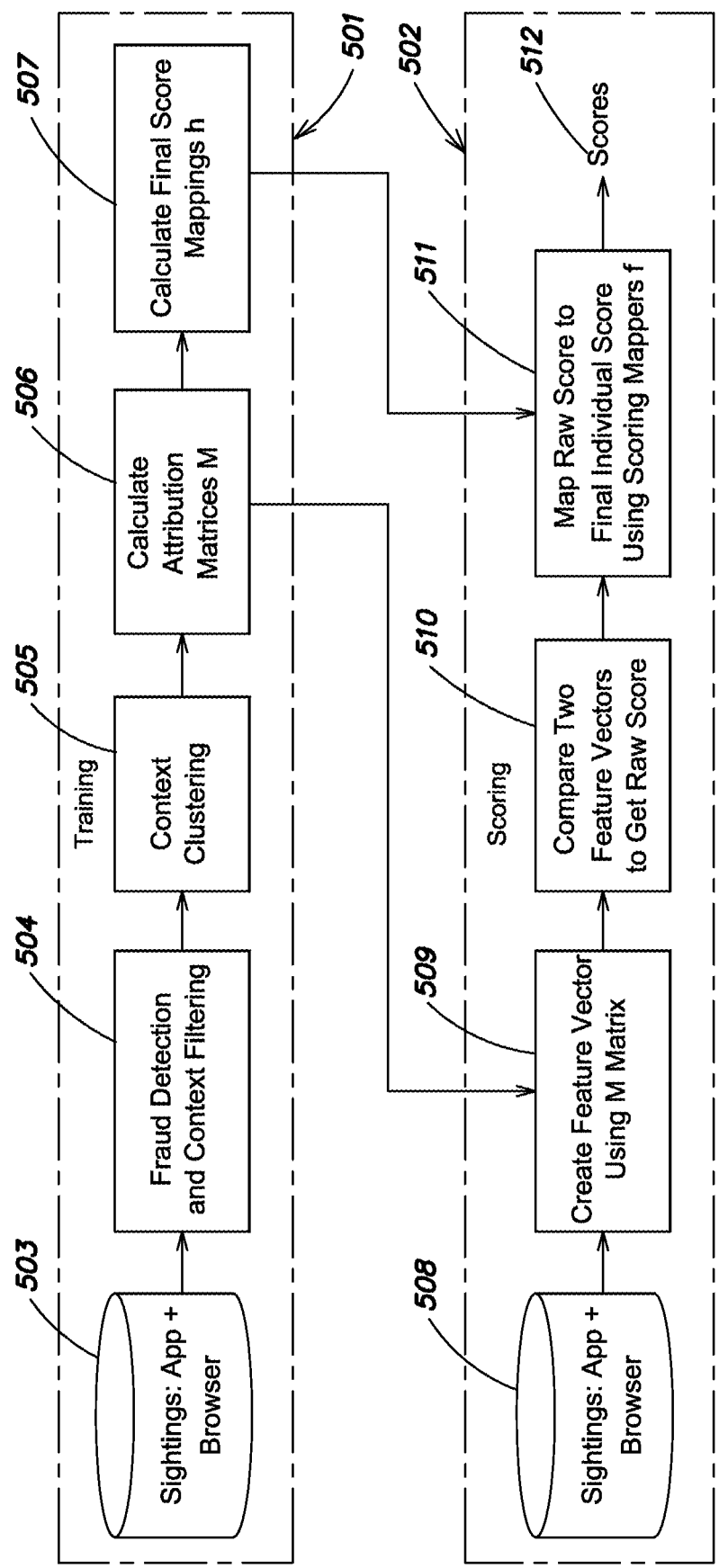
FIG. 5 shows another example process for analyzing user device information according to one embodiment of the present invention.

FIG. 5 shows another example process for analyzing device information according to one embodiment of the present invention. For instance, one or more components of system 101 may perform one or more processes within FIG. 5. In block 501, a training process occurs where sighting data (e.g., app and browser sighting information) is used to train a scoring engine (e.g., engine 106) that can determine, based on future sightings, relatively how positive that behavior on any two devices are related. This information may be used to conclude, for example, that the users exhibit similar behavior, or for two connected devices, whether a particular user uses both devices.

As shown in FIG. 5, sighting data 503 is collected and used to train the system during a training procedure 501. At block 504, fraud detection and context filtering may be performed to remove fraudulent information from the sighting data. For instance, it is appreciated that there may be bots that attempt to cheat an advertisement system by creating fake traffic. To avoid having fraudulent data incorporated into a scoring model, fraud detection techniques may be used to filter out such sighting data. One method might also include finding devices and context that are highly clustered, i.e. devices and contexts that are only seen together. These contexts and devices may be then removed from the sighting data.

At block 505, the system may perform context clustering. Prior to building a scoring matrix, it might be helpful to cluster context within the sighting data into super contexts. This capability allows for a reduction in dimensionality and may result in a better-behaved scoring matrix. Clustering may be performed using various methods including modularity clustering and/or clustering based on a reduction in the similarity measures such as correlation. In one embodiment, clustering may be an optional step.

At block 506, the system determines an attribution matrix M. In general, the attribution matrix is a way to map raw sightings per device into a feature vector. Various methods may be used to determine an attribution matrix, including, but not limited to, a Pearson correlation matrix, a Pearson correlation matrix with reduction in dimensionality (SVD), an inverse Cholesky-root of a Pearson covariance matrix, an inverse Cholesky-root of a Pearson covariance matrix with reduction in dimensionality (SVD), OASIS, a modified OASIS, or other method. It is noted that each of the above methods may be used with data that is trained on a per platform pair basis.

At block 507, the system calculates final score mappings h which is used in scoring to map a raw score to a final individual score. For example, a mapping may be determined based on a "win rate" followed by a uniform discretization. For a given raw score R, the win rate is the rate at which a randomly selected unrelated pair of devices of the same platform pair chosen from the training data would have a raw score that exceeds R. For example, for a given device pair, a win rate of 50% implies that half of the randomly selected device peers appeared to be better related than the given device pair.

At block 508, actual sighting data is used to create a feature vector using the M matrix determined during the training process. At block 510, the system compares to feature vectors to obtain a raw score, and the raw scores map to a final individual score using this scoring mappers determined from mappings h determined during training. The scoring process yields one or more scores 512 for device pairs, which indicates the level to which the selected device pairs are related or connected. Such information may be used in association with a device graph as described below with respect to FIGS. 6-9.

Figure 6:
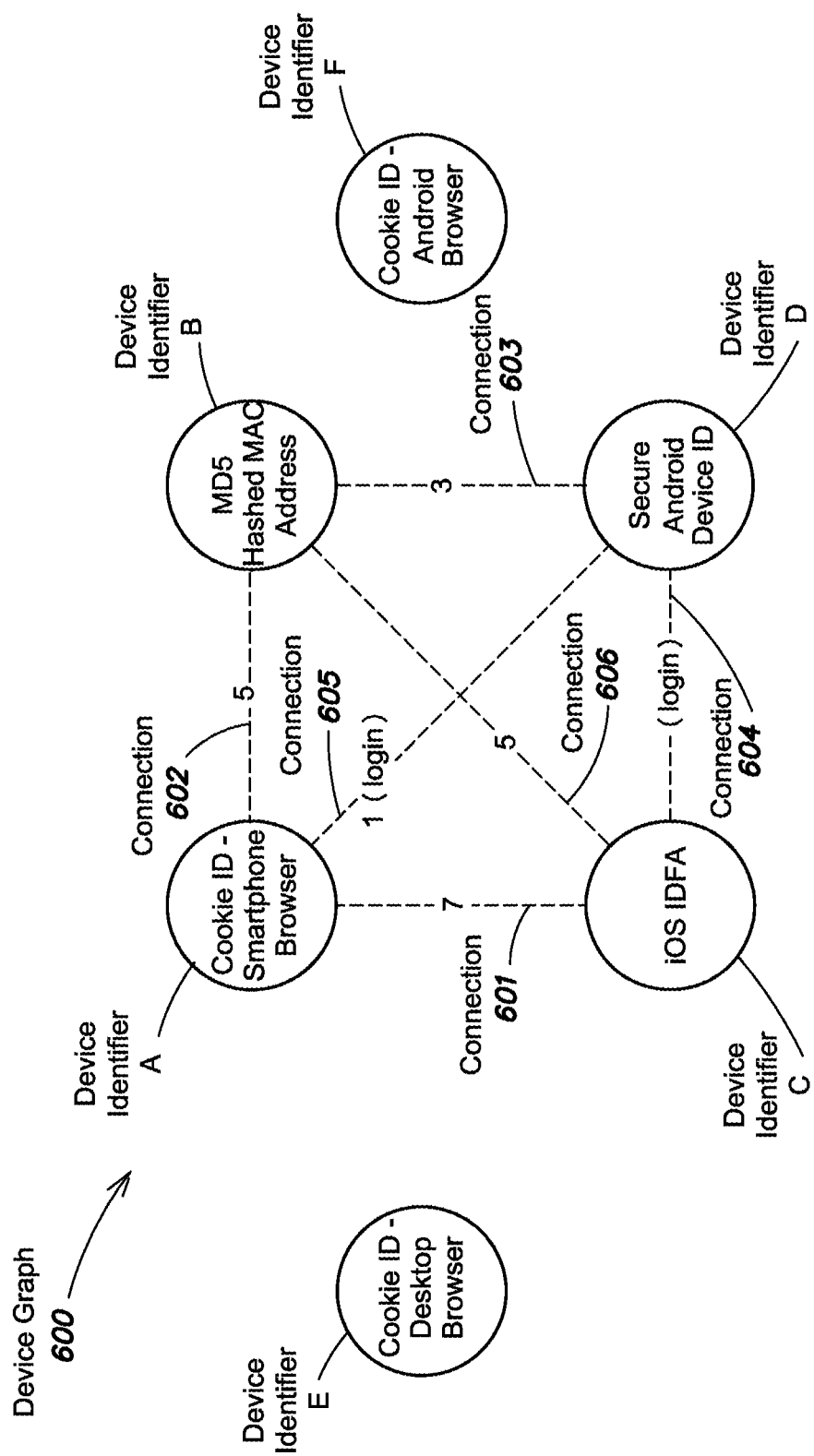
FIG. 6 shows an example device graph that may be used according to one embodiment of the present invention.

FIG. 6 is a diagram illustrating an exemplary device graph 600, according to one embodiment that may be used to analyze user behavior on a number devices according to various aspects of the present invention. The device graph 600 includes six device identifiers, device identifier A, device identifier B, device identifier C, device identifier D, device identifier E, and device identifier F. As discussed above, the device identifier may be an identifier used by a device when the device accesses content (e.g., accesses a news website).

In the example shown, device identifier A may be, for example, a cookie ID for a browser application on a smartphone, device identifier B is an MAC address for a computing device that has been hashed using the Message Digest-5 (MD-5) hashing function/algorithm, device identifier C is an iOS® Identifier For Advertisers (IDFA), device identifier D is a Android® device ID, device identifier E is a cookie ID for a browser application on a desktop computer, and device identifier F is a cookie ID for a browser application on an Android® device.

In the device graph 600, a device identifier may represent a device that associated with the device identifier (e.g., may represent the device that is using the device identifier). In one embodiment, a device may be a computing device and/or an application, software, software modules, and/or other component on the computing device. For example, the device may be one or more of a desktop computer, a laptop computer, a server computer, a PDA, smartphone, web-enabled television set, smart television set, a gaming console, and/or any other device capable of processing, managing and/or transmitting data. In another example, the device may be software, a software module, an application, and/or other component on a computing device. In another example, the device may be one or more of a web browser, an application (e.g., a mail application or a social networking application installed on smartphone), a game application, a media player application (e.g., a video player or a music player), a software module (e.g., an add-on or a component for a browser application), etc.

Each device (e.g., each computing device and/or each software or application) may have one or more device identifiers. For example, a smartphone (e.g., a device) may have a MAC address, a serial number (e.g., a serial number from a manufacturer an Open Device Identification Number (ODIN), a Unique Device Identifier (UDID), an OpenUDID, a Globally Unique Identifier (GUID), an IMEI number, an IP address, etc.), which may each be device identifiers. In another example, applications, software, and/or software modules may also have device identifiers. For example, an application on a computing device may have a serial number which may be the device identifier for the application. In another example, a web browser application may have cookie which includes an identifier and the identifier in the cookie (e.g., the cookie ID) may be the device identifier for the web browser application.

In a further example, an application (e.g., a mobile news application, a game, etc.) may use different types of device identifiers (e.g., a GUID, a UUID, etc.). In other embodiments, device identifiers may include, but are not limited to, IP addresses, a MAC addresses, IMEI numbers, serial numbers, ODINs, UDIDs, OpenUDIDs, GUIDs, cookie IDs, an iOS® IDFA, an Identifier for Vendors (IDFV), and/or any other data/information which may be used to identify a device (e.g., an application, software, and/or a computing device). In one embodiment, a device identifier may be a number (e.g., 734598238742), an alphanumeric value (e.g., A984FDSJL334), a string of characters (e.g., HZ$98!324*1), or any type of value that may be used to identify a device (e.g., an application, software, and/or a computing device).

In one embodiment, a device (e.g., a computing device, an application, software, a software module, etc.) may generate a device identifier. For example, when the application (e.g., a device) is installed onto the computing device the application (or an installer/install file for the application) may generate a device identifier based on an address associated with the computing device. In another example, a computing device (e.g., a device, such as a smartphone), may generate a device identifier based on other identifiers for the computing device (e.g., the smartphone may generate a device identifier based on an IMEI number or a UDID for the smartphone). In some embodiments, the device (e.g., a computing device, an application, etc.) may use a variety methods, algorithms, operations, and/or functions, to generate device identifiers. For example, an application on a computing device may use a cryptographic hash function (e.g., Secure HashAlgorithm-1 (SHA-1), Secure Hash Algorithm-2 (SHA-2), Message Digest-5 (MD-5), etc.) to generate a device identifier for the application based on an IMEI for the computing device. In another example, a computing device (e.g., a tablet computer) may use a random number generator (e.g., a Pseudo-Random Number Generator (PRNG)) to generate a device identifier based on an address associated with the computing device.

Referring back to FIG. 6, the device identifier A is connected to device identifier B via connection 602, to device identifier C via connection 601, and to device identifier D via connection 605. The device identifier B is connected to the device identifier C via connection 606 and to device identifier D via connection 606. The device identifier C is connected to the device identifier D via connection 604. Device identifier E and device identifier F are not connected to other device identifiers. Each of connections 601-606 has a weight associated with the connection. Connection 602 has a weight of 5, connection 601 has a weight of 7, connection 603 has a weight of 3, connection 604 does not include a weight, connection 605 has a weight of 1, and connection 606 has a weight of 5. In one embodiment, the connections in the device graph 600 (e.g., connections 601-606) may be identified based on (i) network data (e.g., identified based on whether device identifiers used the same network/network gateway), (ii) login information (e.g., based on whether two devices for two device identifiers used the same login information to access content from a partner such as a publisher, an advertiser, etc.), and/or (iii) both network data and login information.

In one embodiment, the weight of the connection (e.g., the weight 7 for connection 601) may be indicative of how closely or how strongly two device identifiers are associated with each other. For example, the weight for each connection may be a numeric value (e.g., a number). A higher numeric value may indicate that two device identifiers are closely associated with each other and a lower numeric value may indicate that two device identifiers are less closely associated with each other. In one embodiment, a closer association between two device identifiers may indicate that the two device identifiers originate from the same computing device. For example, a first device identifier may be an identifier for a computing device (e.g., a smartphone) and a second device identifier may be for an application (e.g., a web browser) that is used on the computing device. In another example, a first device identifier may be an identifier for a first application (e.g., a web browser) on a computing device and the second device identifier may be for a second application (e.g., a game or social networking application) on the same computing device. In another embodiment, a closer association between two device identifiers may indicate that the two device identifiers originate from computing devices that are used by the same user, or that are used by users who know each other (e.g., members of a household, friends, etc.). For example, the first device identifier may be for a first computing device (e.g., a smartphone) used by a user and the second device identifier may be for a second computing device (e.g., a laptop computer) used by the same user. In another example, the first device identifier may be for a first computing device (e.g., a tablet computer) used by a user and the second device identifier may be for a second computing device (e.g., a laptop computer) used by a family member (e.g., husband, wife brother, sister, son, daughter, etc.) of the user.

In one embodiment, the connections 601-606 may also include other information in addition to the weights. For example, the connection 604 includes information (e.g., the text/value "login") indicating that the connection 604 was established because the device associated with device identifier C and the device associated with device identifier D used the same login information (e.g., same username/password) to access content from a partner (e.g., publisher, advertiser). In another example, the connection 605 includes information (e.g., the text/value "login") indicating that the connection 605 was identified because the device for device identifier A and the device for device identifier D used the same login information to access content from a publisher (e.g., used the same username/password to access an email account), and information (e.g., the weight "1") indicating that the connection 605 was also identified because device identifier A and device identifier D used the same network gateway (e.g., accessed the publisher service via the same Wi-Fi network). In addition, the connection may also include information indicating the name of the partner (e.g., a publisher, an advertiser, etc.) that provided the login information. For example, the connection may include the text/value "login-Gmail®" indicating that the login information was received from Google®, or the connection may include the text/value "login/Pandora®" indicating that the login information was received from Pandora®. In a further example, the connection may also include information indicating where the network data (that was used to identify the connection) was obtained from (e.g., a merchant server, a content server, an advertisement server, a network data server, etc.). Although strings or text are illustrated in FIG. 6 to represent the additional information, in other embodiments, the additional information (e.g., information indicating how a collection was identified) may be represented using other strings, numbers, alphanumeric values, and/or other representations. For example, the text "network" may be included in a connection to indicate that the connection was identified because two device identifiers used the same network.

In one embodiment, the connections between the device identifiers may not include weights. For example, when a connection between two device identifiers is identified using login information, the connection may not include a weight.

As discussed above, the connections 601-606, and the weights for the connections are determined or identified using network data and/or login information (e.g., username and/or password) that is used by different devices to access a partner's (e.g., publisher's, advertiser's) website. The network data may include a device identifier (e.g., an iOS® IDFA, a Android® device ID, an identifier in a cookie, etc.) for a device (e.g., a computing device and/or an application), a type of a network used by the device (e.g., whether the network is a residential/home network, or a commercial/business/corporate network), an identifier for the network (e.g., an IP address for the network, such as the IP address for a Wi-Fi router) that is used by the device, a type for the content that was accessed by the computing device and/or application (e.g., news content, music content, video content, etc.), an identifier for the servers that host the content (e.g., an IP address or a domain name for the servers), user agent information (e.g., the type of a browser, such as Mozilla®, Safari®, Firefox®, Chrome®, Internet Explorer®, etc.), website header information (e.g., HTTP headers/fields), and/or a time that the content was accessed (e.g., Sep. 1, 2012 at 1:25 PM PST). In one embodiment, the network data may be generated, obtained and/or inferred by a server (e.g., tracking server 305, network data server 325, etc., as shown in FIG. 3) based on other data (e.g., based on other network data). For example, based on the IP address of a device, the server may be able to determine the type of the network (e.g., whether the network is a residential or a commercial network) by performing an IP address lookup.

The servers that host or store the content (e.g., websites, multimedia content, etc.) that is accessed by the devices may obtain and/or record network data when the device accesses the content. For example, a server that hosts a news website may obtain a cookie ID for a web browser on a smartphone. In another example, a server that hosts social networking content may obtain an IP address for a tablet computer that accesses the social networking content. In one embodiment, these servers may provide the network data (e.g., device identifiers, network types, identifiers for the servers, etc.) to an identifier module. The identifier module may obtain and/or create a device graph (such as device graph 600) based on network data received from the servers. In another embodiment, the servers may provide the network data to a network data server (e.g., a server for an online data vendor/partner which collects and stores the network). For example, the network data server may collect network data from multiple servers that host different content. In another example, one or more of a content server, a merchant server, and an advertisement server may provide the network data to the identifier module. The network data server may provide the network data to the identifier module. The identifier module may obtain and/or create a device graph (such as device graph 600) based on network data received from the servers. In a further embodiment, an application/software on a computing may obtain device identifiers (e.g., a MAC address, an IP address, an IMEI number, a UDID, among others) and may provide these identifiers to the identifier module. For example, a game application that is installed on a smartphone may obtain the iOS® IDFA for the smartphone and may provide the iOS® IDFA to the identifier module.

In another embodiment, the identifier module may obtain login information and network data from different servers.

The identifier module may identify connections between different device identifiers, based on the login information. For example, the identifier module may obtain hashed login information that was used to access an email server. The identifier module may determine that two different devices (each with different device identifiers) used the same login information (e.g., same username and/or password) to access an email account. The identifier module may create a connection between the two device identifiers (e.g., between the two devices) because the two devices associated with the two device identifiers used the same login information to access the email account.

In one embodiment, the weights for the connections 601-606, and the weights may be increased or decreased based on different criteria, rules, factors, and/or conditions. For example, the weight for the connection 602 may be increased if device identifier A and device identifier B are seen on the same residential network within a period of time (e.g., seven days). In another example, the weight for connection 606 may be decreased of device identifier B and device identifier C have not been seen on the same residential network for a period of time (e.g., two weeks). The identifier module may increase and/or decrease the weights for the connections 601-606 based on the network data received from the servers and/or the network data server.

In one embodiment, device identifiers may be removed from the device graph 600. For example, device identifier E is not connected to other device identifiers. After a period of time (e.g., 30 days, 7 days, etc.), the device identifier E may be removed from the device graph 600 if the device identifier E is still not connected to other identifiers or the device identifier has not been refreshed in a threshold period of time. In another embodiment, device identifiers may be added to the device graph 600. For example, a new device identifier may be added to the device graph and a new connection may connect the new device identifier to device identifier F (not shown in the figures).

In one embodiment, a server may manage, update, and/or track all device identifiers (e.g., all identifiers for computing devices, software, application, etc.) and the connections between all the device identifiers using a single device graph. Because all device identifiers may be included in a single device graph, the single device graph may include disjointed groups of connected device identifiers and single device identifiers that have no connections. In another embodiment, there may be separate device graphs that contain different device identifiers and connections.

Figure 7:
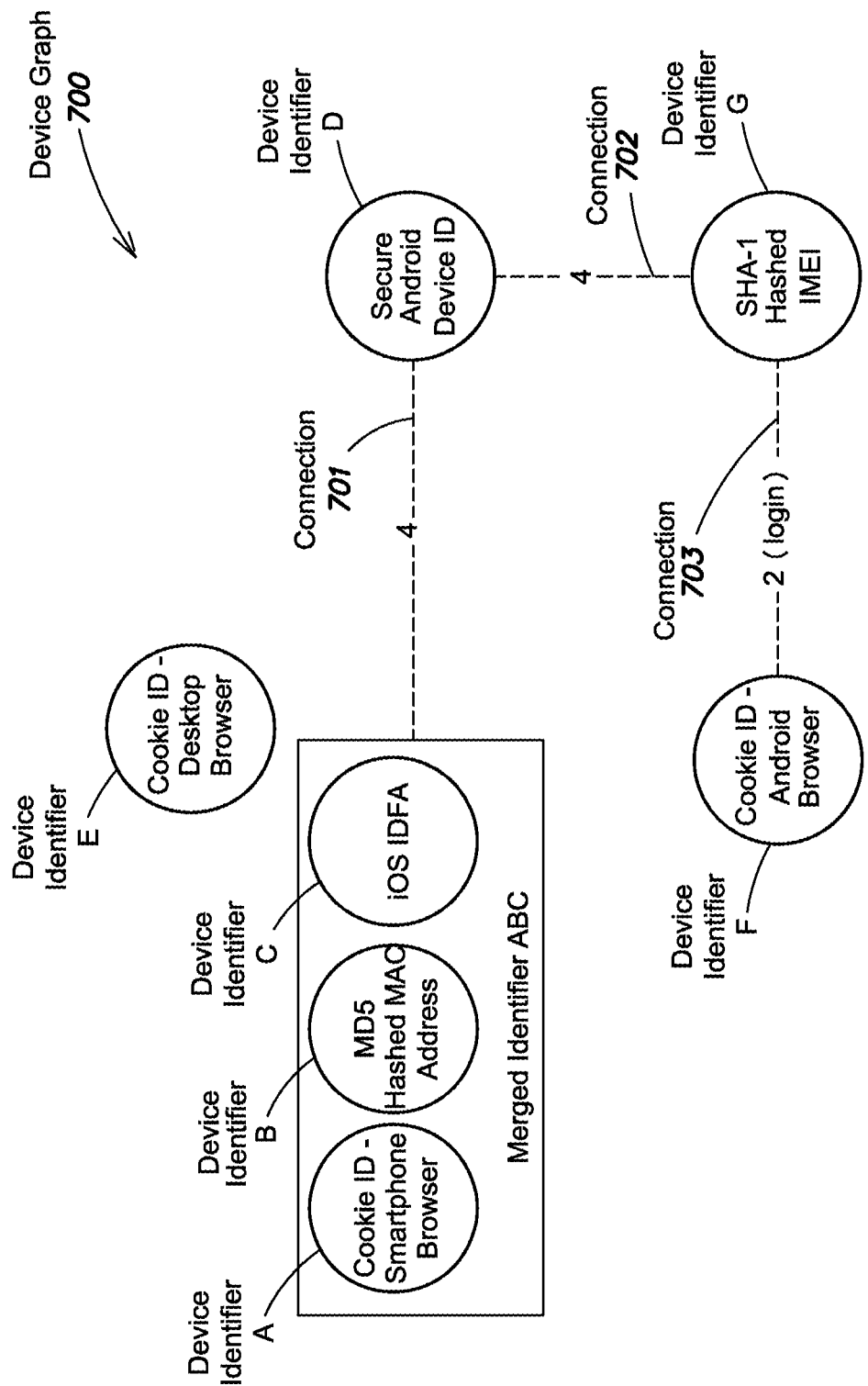
FIG. 7 shows an example process for merging device identifiers according to one embodiment of the present invention.

FIG. 7 is a diagram illustrating an exemplary device graph 700, according to another embodiment. The device graph 700 also includes device identifier A, device identifier B, device identifier C, device identifier D, device identifier E, device identifier F, and device identifier G. Device identifier A is a cookie ID for a browser application on a smartphone, device identifier B is an address for a computing device (e.g., a MAC or other type of address) that has been hashed using the Message Digest-5 (MD-5) hashing function/algorithm, device identifier C is an iOS® Identifier For Advertisers (IDFA), device identifier D is a Android® device ID, device identifier E is a cookie ID for a browser application on a desktop computer, device identifier F is a cookie ID for a browser application on an Android® device, and device identifier G is an IMEI for a computing device that has been hashed using the Secure Hashing Algorithm-1 (SHA-1). The graph 700 also includes a merged identifier ABC. The merged identifier ABC aggregates device identifier A, device identifier B, and device identifier C, so that they are equivalent.

Merged identifier ABC is connected to device identifier D via connection 701 and connection 701 has a weight of 4. Device identifier D is connected to device identifier G via connection 702 and connection 702 has a weight of 4. Device identifier F is connected to device identifier G via connection 703 and the connection 703 has a weight of 2. The connection 703 also includes information (e.g., the text/value "login") indicating that the connection 703 was identified because both the device identifier F and the device identifier G accessed content (e.g., a website, a service, etc.) using the same login information (e.g., same username/password).

In one embodiment, device identifiers may be merged if the device identifiers originate from the same computing device. For example, device identifier A may be an identifier for the computing device's operating system (e.g., an iOS® IDFA), device identifier B may be an identifier for a web browser (e.g., a cookie ID), and device identifier C may be an identifier for another application (e.g., a game application) on the computing device (e.g., a serial number for a second application). One of the applications (e.g., the game application) may obtain different identifiers for the computing device and/or the applications on the computing device. For example, the game application may obtain the IMEI number, the iOS® IDFA, and a cookie ID.

The game application may provide these identifiers to the identifier module and may indicate that these three identifiers originate from the same computing device and/or user. The identifier module may merge the different identifiers in a device graph, based on this information. In one embodiment, after device identifiers are merged, when the identifier module later accesses the device graph to find a device identifier, the merged device identifiers are stored as being equivalent to each other. For example, when the identifier module accesses device graph 700 to find device identifier A, the device identifier A is stored in the device graph 700 as being equivalent to device identifier B and/or device identifier C.

In another embodiment, device identifier may be merged when cookie syncing is performed. For example, an advertiser or a publisher may implement cookie syncing between an advertisement exchange (e.g., an ad exchange where bids for advertisements are processed). The advertiser/publisher may use a first cookie ID (e.g., cookie IDA) and the advertisement exchange may use a second cookie ID (e.g., cookie ID B). The identifier module may merge the first cookie ID and the second cookie ID because the publisher and the advertisement exchange have synced the two cookie IDs (e.g., both cookie IDs belong to the same device).

In one embodiment device identifiers may not be merged even though the device identifiers are associated with the same login information or user credentials. For example, as discussed above, the identifier module may identify a connection between two device identifiers because the two device identifiers are associated with the same login information (e.g., same user credentials). The identifier module may not merge the two device identifiers, but may indicate in the connection (e.g., in the extra information included in the connection) that the connection was identified based on login information.

In another embodiment, device identifiers may be merged if the device identifiers are associated with the same user credentials for a server. For example, a user may use desktop computer at work to log into an email website. The desktop computer may have the device identifier A. The user may also use an email application on a smartphone to access the same email website when the user is away from a computer. The email application may have the device identifier B. The user may also use a web browser on a tablet computer to access the email website when the user is at home (e.g., at the user's residence). The table computer may have the device identifier C. Because the user may use the same user credentials (e.g., username, password, personal identification number (PIN), etc.), the server that hosts the email website may provide network data indicating that device identifiers A, B, and C, are all associated with the same user credentials. The device identifiers A, B, and C, may be merged or combined into the merged identifier ABC, based on the network data. However, it should be appreciated that devices may not be merged if different users utilize the same device (e.g., a shared family PC, gaming system, etc.). In this case, it may be useful to discern which user is operating a common device at a specific instance.

In one embodiment, when multiple device identifiers are merged, the connections and the weights for the multiple device identifiers may also be merged or combined. For example, as illustrated in FIG. 6, device identifier A is connected to device identifier D via connection 605 that has a weight of 1, device identifier B is connected to device identifier D via connection 603 that has a weight of 3, and device identifier C is connected to device identifier D via connection 604 that was established using login information. Referring back to FIG. 7, the merged identifier ABC includes device identifiers A, B, and C. The merged identifier ABC is connected to device identifier D via connection 701. The connection 701 has a weight 4, which is the sum of the weights for connections 603-605 shown in FIG. 6. In other embodiments, the weights for connections that have been merged due to the merging of device identifiers may be obtained using other methods. For example, instead of summing the weights of the merged connections, the average weight of the merged connections may be used.

Although FIGS. 6 and 7 illustrate device identifiers, connections between the device identifiers, and weights for the connections using a graph, this information may be represented using different representations and/or data structures. For example, the identifiers, connections, and weights for the connections illustrated in FIG. 7 may be represented using a table. It should be understood that in other embodiments, the device identifiers, connections, and weights for the connections may be represented using other data structures and/or representations, such as graphs, tables, charts, trees, etc.

Figure 8:
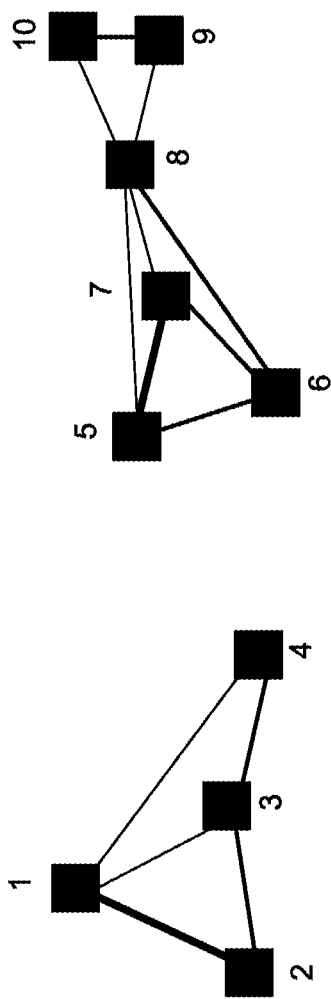
FIG. 8 shows an example device graph according to one embodiment of the present invention.

According to one embodiment, one or more device graphs (e.g., graphs 600, 700) may be used to determine whether certain behavior by user is more likely to be the same user among multiple connected devices. For instance, as shown in FIG. 8, each square shown may be used to represent a device or "node" in the device graph. For instance, according to one model, each device or node in the graph includes several pieces of data associated with it. For instance, each node may be identified by what type of platform it is, what site(s) the note has visited as well as its neighbors within the device graph. For example, nodes "1" and "2" might have information associated with them such as outlined in the following example:

Node 1:
Platform: iPhone
Websites/App Visited: abc.com
Neighbors: Nodes 2, 3, and 4.
Node 2:
Platform: Android Tablet
Websites/Apps Visited: MyWeatherAndroidApp, MyFavoriteAndroidGameApp
Neighbors: Nodes 1, 3, and 4

Such types of information could be generated for Nodes 3 through 10. According to one implementation, the process may consider edges in the graph of one platform type. For example, here we will only consider (in the toy example) iPhone and AndroidTablet edges (that means iPhones connected to AndroidTablets and vice versa but no other devices). This training process is repeated for each platform pair in turn and new matrices/mapping functions are created for each platform pair until the final step.

According to one implementation, in a first phase, behavior information is propagated to connected neighboring nodes. In particular, the process may "propagate" the websites and applications visited to the neighbors (again, considering only edges that are consistent with our chosen platform pair). It is appreciated that because there is generally very little overlap between App based devices (devices that only use apps like many mobile devices) and Browser based devices (devices that only go to websites like computers), one assumption is that by using propagation, the process will add more signal than noise. That is, it is appreciated that devices connected in the graph are more likely to belong to the same user than random devices not connected in the graph.

After propagation, the nodes now look like following:
Node 1:
Platform: iPhone
Websites/App Visited: MyWeatherAndroidApp, MyFavoriteAndroidGameApp, (+any new websites/apps from abc.com devices 3 and/or 4 if 3 and/or 4 are Android Tablets)
Neighbors: Nodes 2, 3, and 4.
Node 2:
Platform: Android Tablet
Websites/Apps Visited: MyWeather AndroidApp, MyFavoriteAndroidGameApp, abc.com, (+any new websites/apps from devices 3 and/or 4 if 3 and/or 4 are iPhones)
Neighbors: Nodes 1, 3, and 4

Figure 9:
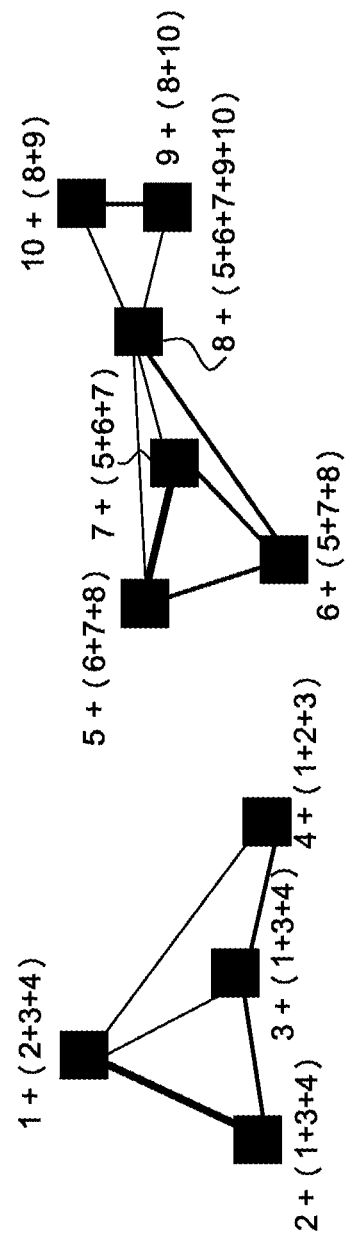
FIG. 9 shows an example device graph where behavior can be propagated within a device graph according to one embodiment.

FIG. 9 shows how the websites/apps could potentially propagate along the whole example graph. Including the propagated websites/apps, simple counts may be recorded of how many devices contain each website/app (note that in this example, multiple sitings of the same site/app on a single device is not considered). Therefore, if a user has been to abc.com 50 times, the process will still only feature one occurrence in the statistics.

For example, the following counts may be observed by one or more computer systems as shown in FIG. 10. For instance, a number or count of sightings may be collected from multiple sites/apps and may be analyzed. As shown in FIG. 10, the node has various counts of visiting abc.com, MyFavoriteAndroidApp, MyFavoriteAndroidGameApp, def.com, xyz.net, awesomeSite.com, 123.com and bestSite.net. The process may then compute how many times each pair occurs together on a device with such propagated contexts (the data is already starting to look like a matrix) as shown by way of example in FIG. 11.

For each pair, the correlation may be computed between them (e.g., by determining a Pearson Correlation). Assume for the example that there is a need to compute the correlation between context "A" and "B".

$$P_{pearson}(A, B) = \frac{P(A, B) - P(A)P(B)}{\sqrt{P(A)(1 - P(A))P(B)(1 - P(B))}}$$

Where P(A) is the probability a device has context "A", P(B) is the probability a device has context B and P(A,B) is the joint probability of A,B meaning that the probability a device has context A and B.

For example, for the pair MyWeatherAndroidApp & MyFavoriteAndroidGameApp (recall that there are "10" devices in this small graph example):
P(MyWeatherAndroidApp)=3/10=0.3
P(MyFavoriteAndroidGameApp)=4/10=0.4
P(MyWeatherAndroidApp, MyFavoriteAndroidGameApp)=2/10=0.2
Therefore, (wherein MyWeatherAndroidApp is referred to as "MWAA" below, and MyFavoriteAndroidGameApp is referred to as "MFAGA" below):

$$P_{pearson}(MWAA, MFAGA) =$$

$$\frac{P(MWAA, MFAGA) - P(MWAA)P(MFAGA)}{\sqrt{P(MWAA)(1-P(MWAA))P(MFAGA)(1-P(MFAGA))}}$$

$$P_{pearson}(MWAA, MFAGA) = \frac{0.2 - 0.3*0.4}{\sqrt{0.3*(1-0.3)*0.4*(1-0.4)}}$$

$$P_{pearson}(MWAA, MFAGA) = \frac{0.2 - 0.12}{\sqrt{0.3*0.7*0.4*0.6}}$$

$$P_{pearson}(MWAA, MFAGA) = \frac{0.08}{\sqrt{0.0504}}$$

$$P_{pearson}(MWAA, MFAGA) = \frac{0.08}{0.224}$$

$$P_{pearson}(MWAA, MFAGA) = 0.36$$

The Full Pearson Matrix for the above co-occurrence counts are as shown by way of example in FIG. 12. Then, the values may be determined that represent the highest correlations, and these highly-correlated entries may be flagged as possible bot correlations. This may be performed by averaging the Pearson correlation and then determining, for example, one (1) standard deviation above the correlation and flagging all those pairs whose Pearson correlation is greater than an average correlation plus a standard deviation of correlation (>avg_correlation+standard_deviation_of_correlation).

For the purpose of an example, consider the determined amount was found to have a correlation >0.55. In this case, the process could flag one or more sites as possible botnet sites as shown in FIG. 13. In one implementation, the system may then remove any pair that contains a website that is known to be popular (e.g., sites that are listed in the Alexa top 10,000 rankings (e.g., as found at http://s3.amazonaws.com/alexa-static/top-1m.csv.zip). Such sites may be removed, as they are not distinctive among multiple users because of their popularity. For example, imagine that the site abc.com is a very common site. The system may be adapted to determine this and could remove the entry. This would leave the sites shown in FIG. 14.

The system may then cluster the remaining ones together using the Pearson correlation as an edge weight. All remaining flagged websites that are in a group equal to or larger than n (e.g., three (3) in the example) are flagged as bots and removed from consideration. This means that pairs which just have a high correlation between them are not flagged as anomalous, only large groups of interconnected devices. In one example implementation, "modularity" clustering may be used to cluster contexts using "community detection". Here, one such cluster exists which consists of sites def.com, 123.com, and xyz.net, and this cluster is removed from the subset. In one implementation, these websites are flagged as fraud/bots and are not considered in scoring.

Determining Attribute Matrix M

The remaining Pearson matrix looks like the matrix as shown by way of example in FIG. 15. However, it is appreciated that this matrix may be very large. The simple one shown by way of example in FIG. 15 is 5×5=25 entries. However, the matrix may be any size, some being as large as 20,000×20,000=400,000,000 entries. This means that for each device, the system needs to perform 400 million multiplications which is untenable at scale. Therefore, according to one implementation, the system is capable of performing a dimensionality reduction. The idea behind one implementation of dimensionality reduction is that some features are redundant. For example, if we always see MyFavoriteAndroidGameApp with abc.com in principle we would only have to consider one of them, because we are getting the same information twice by including both instances. For example, if you knew an animal was a "Poodle" you wouldn't need to also know that it was a "Dog" since the term Poodle would imply Dog. Dimensionality reduction is similar, but looks at overall signals and "maps" the overall signals onto a smaller space. So, instead of a 20,000×20,000 matrix, the system may be configured to "map" the 20,000 dimension onto some smaller number (e.g., a dimension of ~1000) where each new feature is some linear combination of the old features. Where a linear combination means:

$$\text{value\_of\_new\_feature}(j) = \sum_{i \text{ in old\_features}} a(i, j) \text{value\_of\_feature}(i)$$

Where a(i,j)=is a coefficient which maps feature i onto feature j. This mapping means instead of doing 20k*20k computations, the system may perform 20k*1k computations. This reduces the matrix algebra to 1/20th of the previous complexity, which is a big savings in time and processing when data is large.

If all the features in the space are independent, then in principle, all of the components are needed to full specify the space. However, it is appreciated that some features/combination of features are much more important than others. A Singular Value Decomposition (SVD) is a good choose for such reduction. This algorithm may be used by the system to find the "k" most important new features by decomposing the matrix into eigenvectors and eigenvalues. The "k" eigenvectors with the k largest eigvenalues are kept.

For instance, in one example, it is desired to reduce to k=3 eigenvectors. This produces the following matrix (by performing an SVD on the above Pearson matrix) as shown by way of example in FIG. 16. This matrix may be designated the "M" matrix.

Calculate Final Score Mapping h

Now, a second training set of edges (again of a single platform pair type—same as considered above—iPhone/AndroidTablet) may be used to obtain a win rate function, h. Taking the original graph (though generally, you do not use the same devices to test and train, this is just a example so the data is being reused for this example).

Recall the example included these original features:

Node 1:
  Platform: iPhone
  Websites/App Visited: abc.com
  Neighbors: Nodes 2, 3, and 4.

Node 2:
   Platform: Android Tablet
   Websites/Apps Visited: MyWeatherAndroidApp, MyFavoriteAndroidGameApp
   Neighbors: Nodes 1, 3, and 4
(and continuing information for remainder nodes).

Now, each device will have a binary feature vector assigned to it—in this calculation step, the context is not propagated to other nodes. Rather, propagation of contexts between connected nodes is used in the training environment. Binary feature vectors are used to characterize observed behavior. For instance, the entry for that element will be 0 if the device did not visit that site or app, and 1.0 if it visited it any number of times. For node 1 and 2 this would resemble the diagram shown in FIG. 17.

These vectors are then multiplied by the dimensionality reduced M matrix to yield the matrix shown in FIG. 18.

These matrix values may then be normalized to ensure that the length of each vector has a maximum value of 1. This means that the maximum score between two devices becomes 1 as shown by way of example in FIG. 19.

To assign a raw score to the edge 1,2, the system may then determine the dot product of these normalized vectors. In this case:

Normalized $M*fv$(node1)*Normalized $M*fv$(node 2)=0.63

This score may be referred to as a "true" raw score because it is a score between a pair of devices which are connected in the graph—a true positive that indicates a connection. Now, the win rate for this value may be determined. We inspect more edges that have the same platform pair (they connect an iPhone and an Android Tablet in this case).

For each of these edges, two false edges are created. For instance, taking node1 (the iPhone) and compute a score between it and the Android Tablet of edge i (which is not connected to node1). The process does the same procedure with node2 and the iPhone of edge i. This may be referred to as a "false" score because it is a score between two devices which are not connected in the graph (this score corresponds to a false positive).

It may be determined whether this score is greater than or less than the value of 0.63 as determined above. If the value is less than 0.63 then the algorithm "wins" this round. That is, the algorithm has scored a true positive higher than a false positive. If the value is greater than 0.63 then the algorithm "loses" this round.

The system may construct a histogram and determine for each value of the true, raw score, what is the fraction of time that that score will "win". If the score is very high (e.g., close to 1.0) then the algorithm will "win" most of the time and the win rate will be close to a value of 1. If the score is very low, then the algorithm will "lose" most of the time and the win rate will be close to 0. However, in the middle, there may a place where the algorithm wins as often as it loses (basically a coin flip) and the win rate is around 0.5—this is the system cannot distinguish a True edge from a False edge. For example, the binning might look like this as shown by way of example in FIG. 20.

Figure 21:
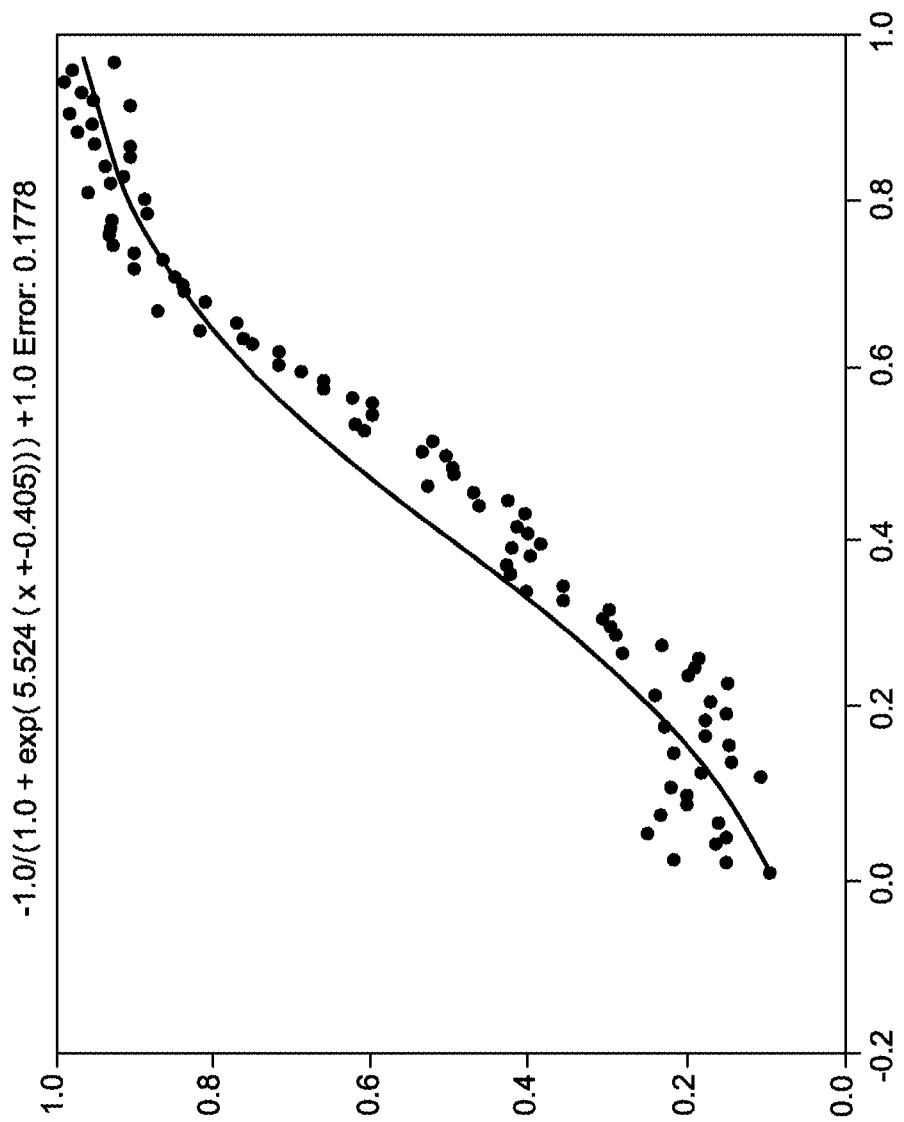
FIG. 21 shows a graph of actual binning and best fit function of that binning according to one embodiment of the present invention.

This binning can be fit to a logistic function of the form:

$$h(\text{true\_score} | \text{platform\_pair}) = \frac{-1.0}{1.0 + e^{a(x+b)}} + 1.0$$

Where a,b are fitting parameters that depend on the platform pair being considered. FIG. 21 shows an example for some real data where the dots are the real data bins and the line is the fit of the logistic function. For the data shown in FIG. 20, a good choice would be a=5.524, b=−0.405 as shown by way of example in FIG. 21.

In a further step, the f mapping may be computed and the process considers all platform pairs together again. The training data used to fit the function h is then used to "bin" the data. First, all of the raw scores are converted into h scores by using the a & b parameters for each platform pair to convert the raw score into an h score. For each platform pair, a representative sample is taken to ensure that platform pair counts are considered in proportion to their true representation in the graph. This means that if 50% of the edges are computer/computer edges, then 50% of the data taken into consideration for the bins will be from computer/computer edge comparisons. If android/ipad=10% then the process uses five times (5×) as many computer/computer edges as android/ipad edges.

The bins may be computed as follows:
For each platform pair, randomly select c(platformPair)*J edges for comparison. Where J is some fixed number to consider and c(platformPair)=fraction of edges in the graph of type platformPair.

Each comparison has the following data:

h(raw score|platformPair) (e.g., the raw score is what was referred to as the "true raw score" above)
We then have "J" values of h, and these values are then sorted. If there are L bins, then J is divided by L. Values that fall between 0->J/L are in bin 1, values that fall between J/L=2*J/L are in bin 2, etc. An equal number of comparisons may be performed to train the h's as shown by way of example in FIG. 22.

By setting J=20, and knowing that the graph is 50% computer/computer, 10% android ipad, and 40% ipad/iphone, implies that 10 computer/computer edges, 2 android/ipad edges, and 8 ipad/iphone edges are selected. If 10 bins (L=10) are desired, J/L=20/10=2. By selecting randomly from the above with these ratios, the same comparison may be selected multiple times—referred to in the art as "sampling with replacement." For instance, entries may be randomly selected for binning as shown in FIG. 23.

The h values in FIG. 23 may be sorted (highlighted by J/L=2) from highest to lowest as shown in FIG. 24. This would produce bin mapping as shown in FIG. 25 (note there are no ties in the data). This bin mapping produces a scoring mapper f as shown in FIG. 26. Note, the process trains the binning on a subsample of data that is expected to be representative data. In the end, the bins have close to an equal number of edges in them, but may not necessarily be perfect and there may be small fluctuations. The more sampling that is taken, the closer to equal mass is obtained.

Scoring

There may be several factors that contribute to scoring. In one implementation, scoring may include the M matrix, the parameters that map raw score to an h score, and an f mapping that maps an h (win rate) score into an approximate bin. In particular, an SVD-reduced M Matrix may be determined for each platform pair and a dictionary indicating which index belong to which feature to perform the matrix multiplication/dot product. Further, fit parameters a, b are determined for each platform pair to map raw score to an h score as discussed above. Finally, an f mapping of the h (win rate) score onto the final equal-mass approximate bin is determined.

Create Feature Vector Using M Matrix

For each edge in the graph, two devices are taken on either side and a feature vector is created using the dictionary to map the features onto a binary vector) as was performed to compute the raw score in the win rate function training discussed above. The vectors are then multiplied by the M Matrix. The resultant is normalized, and the dimensionality vectors are reduced. As discussed above, for our node1 and node2, we arrived at the following vectors as shown by way of example in FIG. 26.

The two feature vectors are compared to obtain a raw score, for example, by taking the dot product of these vectors to obtain the raw score. The h function for that platform pair is used to convert the raw score into a winRate (h) score. For a numerical example, the previously defined node1, node2 example above may be used. Recall that after the feature vectors were created, multiplied each by M, the resultant vectors were normalized, and the dot product was taken, a raw score of 0.63 was obtained.

The system may then map the raw score to a final individual score using scoring mappers f. Finally, the system may then use the h to bin mapping function to map that h score onto a bin. Using h parameters (a=5.524, b=−0.405) for the iPhone/AndroidTablet pair, an h value (win rate) of 0.78 for the edge in question is obtained which is of type iPhone/AndroidTablet and has a raw score 0.63.

Using the determined bin values, it is observed that that the value of 0.78 is in between 0.75 and 0.8 therefore the value of 0.78 maps onto bin 8. Therefore, this edge would get an individual score of 8 (corresponding to the fact that the edge in the ~80% percentile of edges that can be scored). This is the score that is used in the graph to indicate similarity.

It should be appreciated that other methods may be used to analyze siding information. For instance, individuals may be clustered based on bin scores, win rate scores or other determinations. Also, timestamps may be used to decay certain features within the scoring mechanism (e.g., scoring values may change over time as a result). Further, other modifications may be made, by changing different methods for calculating the M matrix, switching from binary vectors to counting vectors, among other changes. These changes are within the spirit and scope of the present invention.

The phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system comprising:
   a memory;
   at least one processor operatively connected to the memory;
   a database, loaded in the memory, adapted to store network sighting data relating to a plurality of devices connected in a device graph comprising pairs of connected devices and pairs of unconnected devices, wherein each of the plurality of devices is associated with a device signature;
   a scoring engine, executed by the at least one processor, configured to determine a win rate for one of the pairs of connected devices within the plurality of devices based on a raw score of the one of the pairs of connected devices and a raw score of one of the pairs of unconnected devices, and score one or more edges of the device graph connecting the plurality of devices, the scoring of the one or more edges comprising:
   accessing first network sighting data;
   generating a first vector for a first node in the device graph using the first network sighting data;
   accessing an attribute matrix generated based at least in part on a subset of the first network sighting data, wherein the attribute matrix is constructed to discount common activity based at least in part on identifying correlations between connected devices to remove noisy network sighting data from consideration from the device graph;
   generating a second vector for the first node using the first vector and the attribute matrix;
   determining correlations between connected nodes within the device graph based at least in part on at least one portion of the first network sighting data;
   determining an edge of the one or more edges of the device graph, the edge representing the relationship between the first device and a second device;
   generating a score for the edge based at least in part on the second vector, a third vector associated with the second node, the attribute matrix, and one or more parts of the first network sighting data; and
   reducing a volume of the first network sighting data
   wherein the at least one processor is configured to select and communicate digital content to one or more devices based at least in part on the scoring of the one or more edges of the device graph.

2. The system according to claim 1, wherein the network sighting data includes at least one portion of data identifying a device access to a website or at least one portion of data identifying a device access to an application program.

3. The system according to claim 2, wherein the network sighting data includes data collected during a period of time.

4. The system according to claim 3, wherein the period of time comprises seven days.

5. The system according to claim 1, wherein the scoring engine is trained at least in part by comparing raw scores for pairs of connected devices in the device graph or raw scores for pairs of unconnected devices in the device graph.

6. The system according to claim 1, wherein the scoring engine is configured to remove common activity based at least in part on identifying correlations between the connected devices exceeding a predetermined threshold.

7. The system according to claim 6, wherein the scoring engine is adapted based at least in part on a grouping of neighboring devices.

8. The system according to claim 7, wherein the grouping of neighboring devices is generated based at least in part on one or more internet protocol (IP) addresses.

9. A method comprising:
maintaining, in a memory of a computer system, a device graph including a representation of a plurality of devices connected by one or more edges, wherein each of the plurality of devices is associated with a device signature;
storing network sighting data relating to a plurality of devices connected in the device graph comprising pairs of connected devices and pairs of unconnected devices; and
scoring, by a scoring engine, the one or more edges of the device graph connecting the plurality of devices, the scoring engine configured to determine a win rate for one of the pairs of connected devices within the plurality of device based on a raw score of the one of the pairs of connected devices and a raw score of one of the pairs of unconnected devices; and
selecting and transmitting digital content to one or more devices based at least in part on the scoring of the one or more edges of the device graph,
wherein the scoring of the one or more edges of the device graph comprises:
accessing first network sighting data;
generating a first vector for a first node in the device graph using the first network sighting data;
accessing an attribute matrix generated based at least in part on a subset of the first network sighting data, wherein the attribute matrix is constructed to discount common activity based at least in part on identifying correlations between connected devices to remove noisy network sighting data from consideration from the device graph;
generating a second vector for the first node using the first vector and the attribute matrix;
determining a correlation between connected nodes within the device graph based on at least one portion of the first network sighting data;
determining for an edge of the one or more edges of the device graph, the edge representing the relationship between the first device and a second device;
generating a score for the edge based at least in part on the second vector, a third vector associated with the second node, the attribute matrix, and one or more parts of the first network sighting data; and
reducing a volume of the first network sighting data.

10. The method according to claim 9, wherein the network sighting data includes at least one portion of data identifying a device access to a website or at least one portion of data identifying a device access to an application program.

11. The method according to claim 9, further comprising analyzing data collected within a time window to determine connections between devices.

12. The method according to claim 11, wherein the time window includes at least a time period of seven days.

13. The method according to claim 9, further comprising-training the scoring engine by using at least one portion of the network sighting data.

14. The method according to claim 13, wherein the training of the scoring engine by using at least one portion of the network sighting data comprises comparing raw scores for pairs of connected devices in the device graph or raw scores for pairs of unconnected devices in the device graph.

15. The method according to claim 9, further comprising generating a group of neighboring devices and adapting the scoring engine based on the group of neighboring devices.

16. The method according to claim 9, further comprising generating groupings of devices based at least in part on one or more internet protocol (IP) addresses associated with the network sighting data.

* * * * *